(12) United States Patent
Harris

(10) Patent No.: US 9,710,097 B2
(45) Date of Patent: Jul. 18, 2017

(54) METHODS AND APPARATUS FOR NATURAL MEDIA PAINTING USING TOUCH-AND-STYLUS COMBINATION GESTURES

(75) Inventor: Jerry G. Harris, Newberry, FL (US)

(73) Assignee: Adobe Systems Incorporated, San Jose, CA (US)

( * ) Notice: Subject to any disclaimer, the term of this patent is extended or adjusted under 35 U.S.C. 154(b) by 1179 days.

(21) Appl. No.: 12/832,962

(22) Filed: Jul. 8, 2010

(65) Prior Publication Data

US 2013/0120281 A1    May 16, 2013

Related U.S. Application Data

(60) Provisional application No. 61/224,788, filed on Jul. 10, 2009.

(51) Int. Cl.
  *G06F 3/041*  (2006.01)
  *G06F 3/0488* (2013.01)
  (Continued)

(52) U.S. Cl.
  CPC ............ *G06F 3/0416* (2013.01); *G06F 3/017* (2013.01); *G06F 3/03545* (2013.01); *G06F 3/04883* (2013.01); *G06F 9/4443* (2013.01)

(58) Field of Classification Search
  CPC ........ G06F 17/15; G06F 3/044; G06F 3/0418; G06F 3/0412; G06F 3/0416; G06F 2203/04107; G06F 3/041; G06F 3/0415
  (Continued)

(56) References Cited

U.S. PATENT DOCUMENTS 5,296,946 A * 3/1994 Kadowaki et al. ........... 358/531
5,596,692 A   1/1997 Martin et al.
(Continued)

FOREIGN PATENT DOCUMENTS

WO    WO-2006003590    1/2006

OTHER PUBLICATIONS

Seok-Hyung Bae, Ravin Balakrishnan, and Karan Singh. ILoveSketch: As-natural-as-possible sketching system for creating 3d curve models. In UIST '08: Proceedings of the 21st annual ACM symposium on User interface software and technology, pp. 151-160, New York, NY, USA, 2008. ACM.

(Continued)

*Primary Examiner* — Md Saiful A Siddiqui
(74) *Attorney, Agent, or Firm* — Wolfe-SBMC

(57) ABSTRACT

Systems and methods for providing a natural media painting application may receive user inputs through tablet stylus gestures, including gestures that are proximity-based and/or context sensitive. The system may also receive user inputs through the touch of a stylus and/or a user touch on a tablet device. Various digital painting and image editing tasks may be invoked and/or controlled using such inputs in response to detecting and recognizing the stylus gestures. Various gestures defined by a combination of touch and stylus manipulation may be mapped to functions or modes of the application. A touch-and-stylus gesture may be used to invoke a change in the work mode, such as an automatic zoom mode, automatic panning mode, steady detail work mode, or snap to grid mode. A touch-and-stylus gesture may trigger adaptation of one or more parameters of the application to assist a user in performing a detected painting operation in progress.

9 Claims, 21 Drawing Sheets

(51) Int. Cl.
*G06F 3/0354* (2013.01)
*G06F 3/01* (2006.01)
*G06F 9/44* (2006.01)

(58) Field of Classification Search
USPC ............... 245/156, 173, 179, 661, 676;
178/18.01–18.09; 715/200, 863; 382/202
See application file for complete search history.

(56) References Cited

U.S. PATENT DOCUMENTS

| | | | |
|---|---|---|---|
| 5,956,020 A * | 9/1999 | D'Amico et al. | 345/173 |
| 6,304,677 B1 | 10/2001 | Schuster | |
| 6,333,996 B1 * | 12/2001 | Kato | 382/189 |
| 6,801,211 B2 | 10/2004 | Forsline et al. | |
| 6,870,550 B1 | 3/2005 | Schuster et al. | |
| 7,511,703 B2 | 3/2009 | Wilson et al. | |
| 7,688,315 B1 | 3/2010 | Gettemy et al. | |
| 7,870,496 B1 | 1/2011 | Sherwani | |
| 8,610,744 B2 | 12/2013 | Harris | |
| 9,483,138 B2 | 11/2016 | Harris et al. | |
| 9,645,664 B2 | 5/2017 | Harris | |
| 2002/0067350 A1 | 6/2002 | Ben Ayed | |
| 2002/0181744 A1 * | 12/2002 | Vablais et al. | 382/107 |
| 2003/0117408 A1 * | 6/2003 | Forsline et al. | 345/581 |
| 2003/0156756 A1 | 8/2003 | Gokturk et al. | |
| 2004/0001048 A1 | 1/2004 | Kraus et al. | |
| 2004/0046736 A1 | 3/2004 | Pryor et al. | |
| 2004/0155888 A1 * | 8/2004 | Padgitt et al. | 345/619 |
| 2005/0069204 A1 | 3/2005 | Khomo | |
| 2006/0109252 A1 | 5/2006 | Kolmykov-Zotov et al. | |
| 2006/0152495 A1 | 7/2006 | Gombert | |
| 2006/0161870 A1 | 7/2006 | Hotelling et al. | |
| 2006/0267966 A1 | 11/2006 | Grossman et al. | |
| 2008/0036743 A1 | 2/2008 | Westerman et al. | |
| 2008/0036771 A1 | 2/2008 | Bae | |
| 2008/0046425 A1 * | 2/2008 | Perski | 707/6 |
| 2008/0168403 A1 | 7/2008 | Westerman et al. | |
| 2008/0252645 A1 * | 10/2008 | Mouilleseaux et al. | 345/442 |
| 2009/0138830 A1 | 5/2009 | Borgaonkar et al. | |
| 2009/0183193 A1 | 7/2009 | Miller, IV | |
| 2009/0237421 A1 | 9/2009 | Kim et al. | |
| 2009/0265670 A1 * | 10/2009 | Kim et al. | 715/863 |
| 2009/0319894 A1 * | 12/2009 | Markiewicz et al. | 715/702 |
| 2010/0005428 A1 | 1/2010 | Ikeda et al. | |
| 2010/0013676 A1 | 1/2010 | Do et al. | |
| 2010/0149109 A1 | 6/2010 | Ellias | |
| 2010/0160041 A1 | 6/2010 | Grant et al. | |
| 2010/0171754 A1 | 7/2010 | Hatfield et al. | |
| 2010/0261526 A1 * | 10/2010 | Anderson et al. | 463/31 |
| 2010/0309115 A1 | 12/2010 | Sabanai et al. | |
| 2013/0120463 A1 | 5/2013 | Harris | |
| 2013/0125068 A1 | 5/2013 | Harris | |
| 2014/0104211 A1 | 4/2014 | Harris | |

OTHER PUBLICATIONS

Ari Y. Benbasat and Joseph A. Paradiso. Compact, configurable inertial gesture recognition. In CHI '01: CHI '01 extended abstracts on Human factors in computing systems, pp. 183-184, New York, NY, USA, 2001. ACM.

John Darby, Baihua Li, and Nick Costen. Activity classification for interactive game interfaces. International Journal of Computer Games Technology, vol. 2008(3): pp. 1-7, 2008.

Guisheng Fang, Lili He, Fansheng Kong, and Li Zengfang. An online sketching and gesture editing system for conceptual design. Computer-Aided Industrial Design and Conceptual Design, 2006. CAIDCD '06. 7th International Conference on, pp. 1-6, Nov. 2006.

Joseph J. LaViola, Jr. and Robert C. Zeleznik. Mathpad2: A system for the creation and exploration of mathematical sketches. ACM Trans. Graph., 23(3): pp. 432-440, 2004.

Edison Pratini. Modeling with gestures: Sketching 3D virtual surfaces and objects using hands formation and movements. In 1st ASCAAD International Conference, e-Design in Architecture, pp. 35-41, Dec. 2004.

Ronit Slyper and Jessica Hodgins. Action capture with accelerometers. In 2008 ACM SIGGRAPH / Eurographics Symposium on Computer Animation, pp. 193-199, Jul. 2008.

"Non-Final Office Action", U.S. Appl. No. 12/832,961, (Oct. 4, 2012), 15 pages.

"Final Office Action", U.S. Appl. No. 12/832,960, (Nov. 14, 2012), 21 pages.

"Non-Final Office Action", U.S. Appl. No. 12/832,960, (May 10, 2012), 18 pages.

"Final Office Action", U.S. Appl. No. 12/832,961, (Apr. 16, 2013), 21 pages.

"Notice of Allowance", U.S. Appl. No. 12/832,961, (Aug. 6, 2013),13 pages.

"Non-Final Office Action", U.S. Appl. No. 12/832,960, (Oct. 7, 2013), 21 pages.

"Supplemental Notice of Allowance", U.S. Appl. No. 12/832,961, (Nov. 20, 2013), 2 pages.

"Final Office Action", U.S. Appl. No. 12/832,960, May 21, 2014, 29 pages.

"Non-Final Office Action", U.S. Appl. No. 14/055,327, Mar. 3, 2015, 28 pages.

"Final Office Action", U.S. Appl. No. 12/832,960, May 20, 2015, 33 pages.

Gleicher,"Image Snapping", Proceedings of the 22nd Annual Conference on Computer Graphics and Interactive Techniques, Sep. 1995, 8 pages.

"Non-Final Office Action", U.S. Appl. No. 12/832,960, Nov. 6, 2014, 32 pages.

"Restriction Requirement", U.S. Appl. No. 14/055,327, Dec. 3, 2014, 6 pages.

Baxter, et al., "DAB: Interactive Haptic Painting with 3D Virtual Brushes", In Proceeding of ACM SIGGRAPH (2001), Aug. 12, 2001, 8 Pages.

"Non-Final Office Action", U.S. Appl. No. 12/832,960, Apr. 4, 2016, 34 pages.

"Non-Final Office Action", U.S. Appl. No. 14/055,327, Feb. 23, 2016, 38 pages.

"Final Office Action", U.S. Appl. No. 14/055,327, Oct. 4, 2016, 45 pages.

"Notice of Allowance", U.S. Appl. No. 12/832,960, Jul. 28, 2016, 8 pages.

"Final Office Action", U.S. Appl. No. 14/055,327, Oct. 22, 2015, 41 pages.

"Supplemental Notice of Allowance", U.S. Appl. No. 14/055,327, Apr. 11, 2017, 2 pages.

"Notice of Allowance", U.S. Appl. No. 14/055,327, Jan. 27, 2017, 9 pages.

* cited by examiner

METHODS AND APPARATUS FOR NATURAL MEDIA PAINTING USING TOUCH-AND-STYLUS COMBINATION GESTURES

PRIORITY INFORMATION

This application claims benefit of priority of U.S. Provisional Application Ser. No. 61/224,788 entitled "Methods and Apparatus for Natural Media Painting Using a Realistic Brush and Tablet Stylus Gestures" filed Jul. 10, 2009, the content of which is incorporated by reference herein in its entirety.

BACKGROUND

Description of the Related Art

Natural media painting simulation refers to digital, computer-based creation techniques for creating digital paintings or other digital works that attempt to mimic real-world "brush, palette, and canvas" painting. Advances in natural media painting simulation have extended the conventional digital painting paradigm in ways that have significant painting workflow implications. New features have added significant complexity to the painting workflow. For example, the user may have to deal with cleaning a dirty brush, refilling it when it runs out of paint, drying it out to create dry brush strokes, splitting the tip to create scratchy strokes, reforming the tip to create fine lines, and so on. Conventional user interface (UI) methodologies require creating UI widgets to control each of these functions, which forces the user to constantly switch between focusing on their art on the canvas, and focusing on widgets on a UI panel. With the size of art canvases quickly outpacing the size of monitors, these UI widgets often exist off-screen and the user must first call up the panels before manipulating and dismissing them. All of this amounts to a severe distraction from the actual painting task.

SUMMARY

Various embodiments of methods and apparatus for natural media painting using a realistic brush model and tablet stylus gestures are described. Some embodiments may provide methods for performing various digital painting and image editing tasks using a natural, gesture-based approach via a tablet type device and a stylus. Some embodiments may provide detection of stylus gestures that mimic the real-world actions of artists in real (as opposed to digital) painting, and may perform appropriate digital painting and image editing actions in response to detecting one or more of the stylus gestures. By supporting the use of stylus gestures that mimic the real-world actions, the system may lower the cognitive load of the user and allow the user to focus on creativity as opposed to the workings of and user interfaces provided by conventional graphics applications. Some embodiments may enable gesture-based natural media painting workflows by providing a set of six degrees of freedom (6DOF) stylus-based gestures for use with stylus and tablet input technologies, which may be augmented with additional hardware, and by mapping these stylus gestures to painting tasks in a natural media model.

Using a stylus, tablet, and software such as a tablet/stylus input module of a graphics application, embodiments may collect data from the stylus and/or tablet in response to user manipulation of the stylus and/or tablet to, for example, perform various user manipulation tracking tasks including but not limited to acceleration, position, orientation, and proximity detection for the stylus, and touch and pressure detection for the tablet. The collected data may be used to recognize various stylus gestures in real-time or near-real time; the recognized stylus gestures may be mapped to appropriate real-world painting actions that are then simulated in the graphics application as described herein.

Stylus gestures that may be detected in embodiments may include, but are not limited to: translations in one or more dimensions, rotations (including barrel rotations involving twisting about the major axis of the stylus), fanning motions (in which the tip of the stylus is waved back and forth above the tablet), a mashing down motion (i.e. pressing the stylus into the tablet with high pressure), a jerking up motion (i.e. a quick motion away from the tablet), a jerking down motion (i.e. a quick motion towards the tablet), shaking the stylus away from the tablet (e.g., performed by holding the stylus by its end and flicking the wrist), and shaking the stylus toward the tablet (e.g., performed by holding stylus by its end and flicking the wrist).

Painting actions performed by a brush tool of the graphics application and that may be controlled by various stylus gestures may include, but are not limited to: sharpening the point of a brush by twisting the stylus, cleaning the brush by shaking the stylus away from the tablet, refilling the brush by jerking the stylus down into an area representing a paint well, changing a tool by jerking the stylus up, drying the brush by applying a fanning motion to the stylus, splattering paint from the brush onto an image by shaking the stylus toward the tablet, adding paint to the brush by tapping the stylus in an area representing a paint well, saturating the brush by mashing the stylus down into an area representing a paint well, homogenizing the paint colors on the tip of a brush by twisting the stylus, and splitting the bristles on the tip of a brush by mashing the stylus down onto the tablet.

The stylus gestures and their mapping to natural media painting actions as provided by various embodiments of the systems and methods described herein may provide advantages over conventional widget-based user interfaces for natural media painting for at least the reason that the stylus gestures and their applications in natural media painting may reduce the amount of time a user needs to execute workflow tasks (e.g., due to less hand travel, fewer clicks, etc.). In some embodiments, the use of such gestures may also reduce the cognitive load of the user for those tasks, since the gestures are aligned with pre-existing motor skills cultivated by traditional painting techniques, and since the gestures can be executed in-place with the artwork, which alleviates the need to shift focus away from the art to manipulate widgets.

In some embodiments, the system and methods described herein may provide gesture-based zooming. Some embodiments may use a tablet and stylus to provide an automatic "zoom when near" or "zoom for detail" function, which may simplify the workflow for performing detailed editing that requires zooming into the image. In one embodiment, the automatic zoom function may be provided as an option in a graphics application and/or as an option on a tablet/stylus. When the function is enabled (turned on), as the stylus is moved into proximity of the tablet, the application may zoom into a displayed image to focus on an area of interest. The user may then perform appropriate detail edits, for example on individual pixels of the image or on small groups of pixels of the image. When the stylus is moved away from proximity to the tablet, the application may zoom out on the displayed image to, for example, fit the entire image on the display.

In some embodiments, the system and methods described herein may provide functionality that allows the user to pan across an image when the stylus is in proximity to, but not touching, the tablet surface. In some embodiments, such automated panning may be controlled by the motion of the stylus. In other embodiments, such panning may be performed by holding the stylus in proximity to the tablet and manipulating another user input device such as a track pad, trackball, joystick or mouse.

In various embodiments, one or more thresholds for determining whether the stylus is in proximity with the tablet for the purposes of invoking and/or controlling a given function of a graphics application. Such thresholds may be pre-defined, or may be user configurable through an interface of the graphics application, in different embodiments.

Some embodiments may allow the use of a touch-and-stylus combination gesture to invoke or control one or more functions or modes in a natural media painting application or another graphics application. For example, various gestures defined by a combination of a touch on a tablet device (e.g., by a stylus or a user's finger, fingernail, or hand) and a stylus manipulation may each be mapped to one or more functions or modes of the application. In some embodiments, two or more such functions or modes may be provided as options via a user interface so that the user may select among the two or more functions or modes enabled by the touch-and-stylus gesture. In some embodiments, a function may be automatically selected based on the touch-and-stylus gesture, on the context in which the touch-and-stylus gesture is performed, and/or on whether the stylus is in proximity to the tablet device. Modes that may be provided or controlled via a touch-and-stylus gesture may include, but are not limited to, an automatic zoom mode, an automatic panning mode, a steady detail work mode, or a snap to grid mode.

In some embodiments, a touch-and-stylus gesture may trigger the adaptation of one or more parameters of the natural media painting application to assist a user in performing a detected painting operation in progress. For example, the application may detect and recognize a combination gesture in which a user steadies his hand by touching a part of his hand or finger to the tablet while moving the stylus as if to draw a straight line or arc, and the application may responsively adjust a damping factor of the user input mechanism, enable or disable a snap to grid mode, or invoke a line or arc tool in order to assist the user in drawing the straight line or arc.

Figure 1:
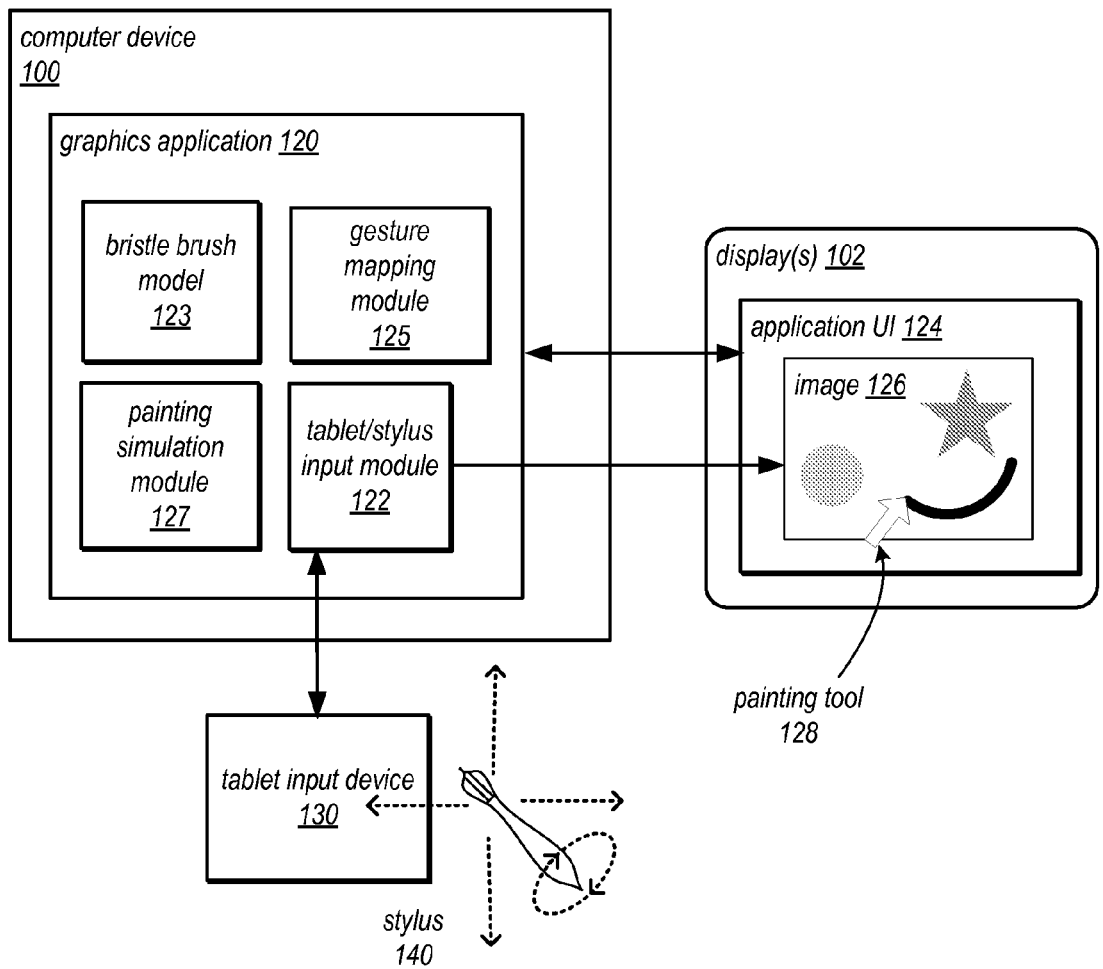
FIG. 1 is a block diagram illustrating a graphics workstation, according to some embodiments.

While various embodiments are described herein by way of example for several embodiments and illustrative drawings, those skilled in the art will recognize that embodiments are not limited to the embodiments or drawings described. It should be understood, that the drawings and detailed description thereto are not intended to limit the embodiments to the particular form disclosed, but on the contrary, the intention is to cover all modifications, equivalents and alternatives falling within the spirit and scope of the disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for natural media painting using a realistic brush and tablet stylus gestures are described. Various embodiments may provide methods for performing various digital painting and image editing tasks using a natural, gesture-based approach via a tablet, stylus, and software such as the tablet/stylus input module of the graphics application described herein. Some embodiments may provide detection of stylus gestures that mimic the real-world actions of artists in real (as opposed to digital) painting, and may perform appropriate digital painting and image editing actions in response to detecting the stylus gestures. This may in some embodiments lower the cognitive load of the user, and allow the user to focus on creativity as opposed to the workings of and user interfaces provided by conventional graphics applications. Various embodiments may enable gesture-based natural media painting workflows by providing a set of six degrees of freedom (6DOF) stylus-based gestures for use with a stylus and tablet input technologies, which may be augmented with additional hardware, and by mapping these stylus gestures to painting tasks in a natural media model.

Advances in natural media painting simulation have extended the traditional digital painting paradigm in ways that have significant painting workflow implications. The new features include, but are not limited to:

A bristle-based brush model, in which the brush consists of a set of bristles that dynamically change shape in response to the physics of the brush stroke. This is in contrast to the single 2D grayscale stamp that is used by conventional digital painting programs.

Support for "wet" and/or "dirty" paint, i.e. support for bidirectional paint transfer (e.g., from the brush to the canvas, and from the canvas to the brush), which enables color blending and smudging in a way that mimics natural paint media. This is in contrast to a unidirectional paint transfer (i.e. the transfer of paint from brush to canvas only, without dirtying the brush) that is used in conventional digital painting programs.

Watercolor painting simulation, which creates the effects of a brush wet with watery paint that slowly dries during a stroke. Conventional paint programs do not simulate these secondary effects, although some use additional tools and textures to create similar results.

These new features add significant complexity to the painting workflow. Therefore, the user has to deal with cleaning a dirty brush, refilling it when it runs out of paint, drying it out to create dry brush strokes, splitting the tip to create scratchy strokes, reforming the tip to create fine lines, and so on. Conventional user interface (UI) methodologies require creating UI widgets to control each of these functions, and force the user to constantly switch between focusing on their art on the canvas, and focusing on the widgets on a UI panel. With the size of art canvases quickly outpacing the size of monitors, these UI widgets often exist off-screen and the user must first call up the panels before manipulating and dismissing them. All of this amounts to a severe distraction from the painting task. However, many of these tasks have corresponding counterparts in the traditional workflow that are commonly executed by real painters without interrupting their focus on the canvas. The systems and methods described herein may mimic these real-world gestures, and thus may save considerable time for users of natural media painting workflows.

As described above, the natural media painting model has workflow implications that may benefit from stylus-based gesture input. In some embodiments, by providing stylus gestures that may mimic real-world workflows of real painting, the systems and methods described herein may lower the cognitive load of the user and allow the user to focus on creativity as opposed to the workings of and user interface to a conventional graphics application. Some embodiments may enable gesture-based natural media painting workflows by providing a set of six degrees of freedom (6DOF) stylus-based gestures for use with tablet input technologies which may be augmented with additional hardware, and by mapping these stylus gestures to painting tasks in a natural media model.

Using a stylus, tablet, and software such as a tablet/stylus input module of a graphics application, such as that illustrated in FIG. 1, some embodiments may collect data from the stylus and/or tablet in response to user manipulation of the stylus and/or tablet to perform various user manipulation tracking tasks. The collected data may include, but is not limited to, acceleration, position, orientation, and proximity data detected for or by the stylus, and touch and pressure data detected for or by the tablet. The collected data may be used to recognize various stylus gestures in real-time or near-real time, and the recognized stylus gestures may be mapped to appropriate real-world painting actions that are then simulated in the graphics application as described below.

FIG. 1 illustrates an example graphics workstation configured to implement the systems and methods described herein, according to various embodiments. As illustrated in this example, the workstation may include, but is not limited to, a computer device 100, one or more displays 102, a tablet input device 130, and a stylus 140. An example computer device which may be used in some embodiments is further illustrated in FIG. 4. As illustrated in this example, computer device 100 may implement a graphics application 120, which may be a natural media painting application, as described herein. Graphics application 120 may include a bristle brush model 123, a painting simulation module 127, a tablet/stylus input module 122, and/or a gesture mapping module 125. In some embodiments, bristle brush model 123 may be a component of painting simulation module 127.

Graphics application 120 may provide a user interface (UI) 124 via one or more displays 102. Graphics application 120 may display, for example in a window provided by the UI 124 on the one or more displays 102, an image 126 that a user is currently working on (e.g., either creating or editing). Graphics application 120 may provide a painting or drawing tool 128 that the user may manipulate, for example via tablet 130 and/or stylus 140, to create or edit content in image 126. The tool 128 may, for example, have various modes that emulate a paintbrush, pencil, eraser, spray can, and so on. While embodiments are generally described as providing gesture-based manipulations of a paintbrush tool, it is to be noted that similar techniques may be applied to other types of painting or drawing tools.

Stylus 140 may be configured to be held in a hand of the user and to be manipulated by the user in relation to tablet 130 to perform various image editing operations or other tasks. The user may manipulate stylus 140 and/or tablet 130 in various ways. For example the user may move stylus 140 away from tablet 130 or towards tablet 130; move stylus 140 up and down, left and right, or diagonally and so on in relation to tablet 130; rotate stylus 140 on one or more axes; touch a touch and/or pressure sensitive surface of tablet 130 with stylus 140 and/or with a finger, knuckle, fingernail, etc.; apply varying amounts of pressure to the touch and pressure sensitive surface of tablet 130 with a finger or stylus 140; move the tip of stylus 140 on the touch and pressure sensitive surface of tablet 130; and so on. Tablet 130 is configured to detect the various manipulations performed by the user with stylus 140 and/or with a finger, knuckle, etc. on the surface of tablet 130 and communicate information regarding the manipulations to tablet/stylus input module 122 on computer device 100, for example via a wired or wireless interface.

Tablet/stylus input module 122 may be implemented as a component or module of application 120, as a library function, as a driver, or as some other software entity. Tablet/stylus input module 122 may be implemented in software, in hardware, or as a combination of hardware and software. Graphics application 120, via tablet/stylus input module 122, may interpret the information regarding the manipulations to detect various gestures and to perform various painting actions in response to the detected gestures for creating or editing content of image 126. For at least some of those actions, painting tool 128 may be appropriately moved, modified, and/or otherwise affected on display 102. Various examples of gestures that may be detected are listed below, as are various examples of painting actions that may be invoked and/or controlled by such stylus gestures.

In some embodiments, software and/or hardware on tablet 130 may perform at least some of the functionality of detecting various gestures. Thus, in some embodiments, tablet 130 may be configured to detect gestures and communicate the detected gestures to graphics application 120, which then performs the appropriate painting actions in response to the gestures. In other embodiments, tablet 130 may only collect information regarding gestures and communicate the gestures to application 120 via tablet/stylus input module 122; tablet/stylus input module 122 may perform the function of detecting the gestures from the information and communicating the gestures to application 120, or to other modules of application 120, which then performs the appropriate painting actions in response to the gestures.

Figure 2:
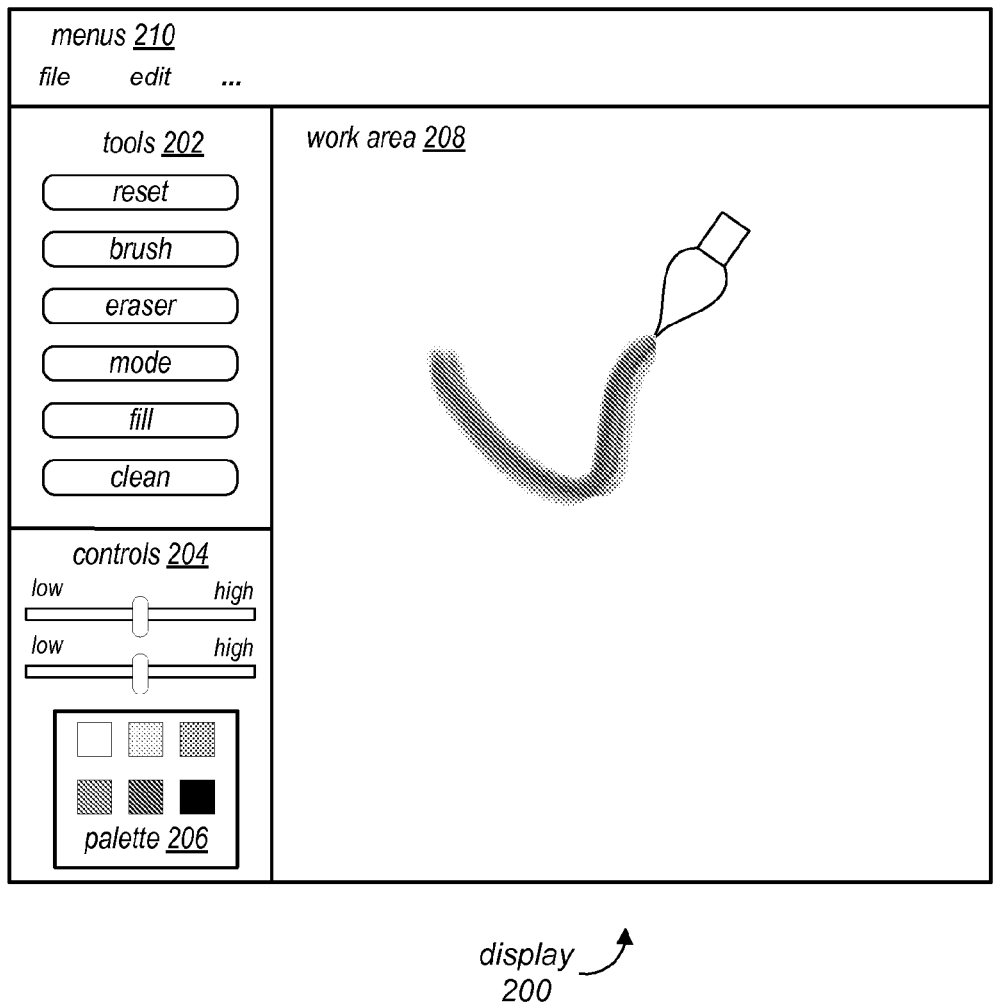
FIG. 2 is a block diagram illustrating a display on which a user interface to a graphics application may be implemented, according to some embodiments.

FIG. 2 illustrates an example display 200 on which a user interface to a graphics editing module, such as image editing operations module of graphics application 120 may be implemented, according to one embodiment. In this example, the display is divided into four regions or areas: menus 210, tools 202 (which may include a "fill" tool, a "clean" tool, and/or a mode selection tool), controls 204 (which may include palette 206), and work area 208. Tools 202 may include one or more user-selectable user interface elements. In this example, it is this area that contains the user interface elements that a user may select to apply various effects to the image. For example, the user may select a brush tool for use in applying paint to an image being created and/or edited in work area 208. Other optional tools may be selected as well, such as an eraser or reset function, in some embodiments. While FIG. 2 shows the elements in tools area 202 as buttons, other types of user interface elements, such as pop-up or pull-down menus, may be used to select from among one or more tools in various embodiments. For example, in one embodiment, the mode selection mechanism illustrated in tools area 202 may be implemented using a pop-up or pull-down menu to select a work mode, such as an automatic zoom mode or an automatic panning mode. As noted above, the reset and eraser tools are optional, and thus may or may not be included on the user interface in various embodiments. Various embodiments may include other tools not shown as well, such as an "undo" tool that undoes the most recent user action in the work area 208.

In this example, controls 204 may include one or more user-modifiable controls, such as slider bars, dials, pop-up menus, alphanumeric text entry boxes, etc., for specifying various parameters of the painting functions to be applied to an image (e.g., using the brush tool). In this example, two slider bars are provided to specify different values (or relative values) of configurable parameters of a painting function. For example, slider bars may be used to specify an amount of ink, a pigment concentration amount, a transparency value, a brush width, a bristle stiffness, or other parameters that are to be applied when using the brush tool to "paint" on the image being created or edited in work area 208. Various methods of specifying values of any of the other parameters used in simulating painting effects (i.e. methods other than those illustrated in FIG. 2) may be used in other embodiments. In some embodiments, slider bars or another input mechanism in controls area 204 may be used to specify one or more threshold distance values for use with proximity based gestures and their corresponding functions in the graphics application, such as those described in more detail below. In some embodiments, slider bars or another input mechanism in controls area 204 may be used to specify a zoom level for an automated zoom function or to override a default zoom level for such a function.

In the example illustrated in FIG. 2, menus 206 may include one or more menus, for example menus used to navigate to other displays in the graphics application, open files, print or save files, undo/redo actions, and so on. In this example, work area 208 is the area in which an image being created or edited is displayed as graphics editing operations are performed. In various embodiments, work area 208 may display a portion or all of a new image to which paint is to be added, or a portion or all of a previously existing image being modified by adding paint, as described herein. In the example illustrated in FIG. 2, work area 208 of FIG. 2 illustrates an image in progress.

Realistic simulation of natural media painting in a digital medium is compelling because it enables a wide variety of effects that are difficult to achieve with conventional digital tools. However, real paint media may be more difficult to manipulate than digital tools, and may take a considerable amount of time and practice to master. Embodiments of the painting simulation module described herein may leverage capabilities of digital tools and techniques to ease the workflows and learning curves associated with natural media paints. In some embodiments, various methods for brush cleaning, brush filling, and applying paint strokes in a manner that mimics real world painting actions may be provided to enable common natural media paint tasks to be automated in a digital painting tool, but with a fairly realistic user experience.

Some embodiments of a painting simulation module, such as painting simulation module 127 described herein may employ a bristle brush model (such as bristle brush module 123) that simulates a brush tip and the notion of the paint being loaded onto the brush tip and updated during strokes and when the painting color is set. The user may also perform a "clean" action, which is equivalent to dipping the brush in, for example, turpentine or water, to remove the paint load, and a "fill" action, which is equivalent to dipping the brush into a well or paint on a palette, replenishing the paint on the brush. In some embodiments, during the act of stroking with the brush, the brush's paint load will be depleted, eventually running out, and the brush may dirty, picking up paint from the canvas, as with a real brush. The clean and fill actions may allow the user to manage the paint load between strokes for the desired stroke effect.

Some embodiments of a painting simulation module may provide an "auto clean" option and/or an "auto fill" option. When turned on or selected, these options may trigger automatic clean and/or fill actions between strokes, for example at the beginning of each new stroke. In other embodiments, a user interface module may provide an interface through which the user may manually fill or clean the brush between strokes. In such embodiments, the user may manually control cleaning and filling of the brush as necessary or desired, similar to the way a painter would use turpentine/water and a paint palette to clean and load a physical paintbrush. Many types of paint effects may require functions having this level of control, such as for depositing some paint to be mixed on the canvas that will shortly dry out and then be blended with the surrounding paints (e.g., to add highlights or touches of color), or for performing multiple stroke tasks with varying brush loads. In some embodiments, to fill a brush with paint, a user may select a "fill" control (such as that illustrated in tools area 202 of FIG. 2), which may load paint of a selected color (e.g., a color selected from palette 206).

The example user interface illustrated in FIG. 2 provides user interface elements to enable or disable an auto clean mode and an auto fill mode according to some embodiments. In this example user interface, a "clean" user interface element (shown as a radio button) is provided whereby a user may manually clean a brush if and when desired, or may enable or disable the auto clean option, in different embodiments. The user interface illustrated in FIG. 2 also includes a color palette whereby a user may manually load a brush with paint if and when desired, and a "fill" user interface element (shown as a radio button) whereby a user may enable or disable the auto fill option.

In some embodiments, a tablet/stylus input module may provide an interface through which the user may fill or clean the brush between strokes by applying particular gestures to a stylus (such as stylus 140), and these gestures may mimic the real world actions used to fill and clean a physical bristle brush, e.g., pressing the brush into a paint well to fill it, and shaking the brush to clean it.

Figure 3:
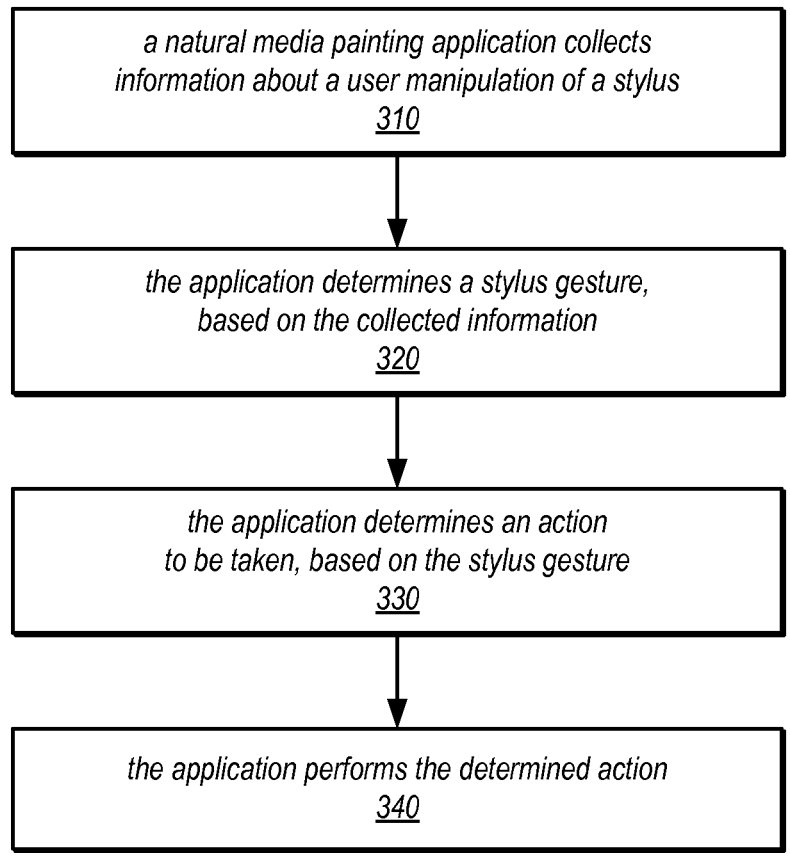
FIG. 3 is a flow diagram illustrating one embodiment of a method for performing operations in a natural media painting application using gestures made with a stylus.

One embodiment of a method for performing various operations of a natural media painting application using gestures made with a stylus is illustrated in FIG. 3. As illustrated at 310 in this example, the method may include a natural media painting application collecting information about a user manipulation of a stylus. For example, the application may collect spatial information collected during the manipulation of the stylus, directional information collected during the manipulation of the stylus, acceleration data collected during the manipulation of the stylus, an initial position of the stylus, an ending position of the stylus, an initial orientation of the stylus, or an ending orientation of the stylus.

The method may include the application determining a stylus gesture, based on the collected information, as is 320. For example, the application may determine that the collected information indicates a translation motion performed by the stylus to move it in one or more dimensions, a twisting motion, a barrel rotation, a fanning motion, a mashing down of the stylus into a tablet device, a jerking up motion, a jerking down motion, a shaking of the stylus away from the tablet device, or a shaking the stylus toward the tablet device As illustrated at 330 in FIG. 3, the method may include the application determining an action to be taken within the application, based on the stylus gesture. For example, one or more painting actions or work mode changes may be mapped (e.g., using gesture mapping module 125 in FIG. 1) to each of a plurality of gestures that can be made using the gesture and detected by the application (e.g., through various interfaces, such as tablet/stylus input mode 122 in FIG. 1). Once the appropriate action has been determined, the method may include performing the determined action, as in 340.

Figure 4:
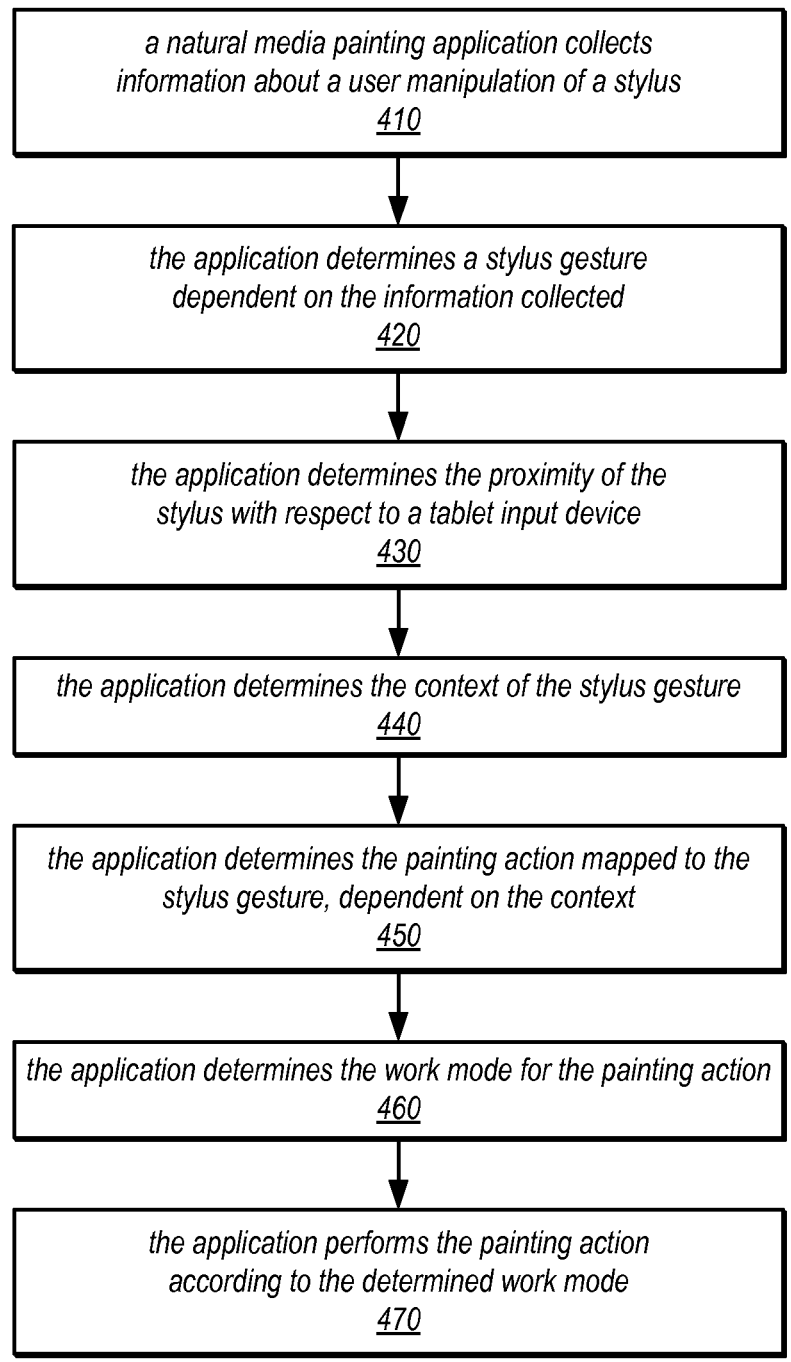
FIG. 4 is a block diagram illustrating one embodiment of a computer device that implements a natural media painting application employing tablet and/or stylus gestures, as described herein.

In some embodiments, a combination of inputs may be analyzed to determine an action to take in response to a gesture made by a stylus. These inputs may include information collected about the manipulation of the stylus itself and/or other information that may provide a context for the gesture, an indication of a workflow in progress, or an indication of a work mode or other parameter of an image editing session. FIG. 4 illustrates one embodiment of a method for collecting inputs for determining a painting action to be taken in response to a user manipulating a stylus. As illustrated in FIG. 4, the method may include a natural media painting application collecting information about a user manipulation of a stylus (as in 410), and determining a stylus gesture dependent on the information collected (as in 420).

As described herein, in some embodiments, the natural media painting application may detect and act upon an input indicating that a stylus is in proximity to a tablet input device. As illustrated in FIG. 4, a method for performing an action in the application may include determining the proximity of the stylus with respect to such a device, as in 430. For example, in some embodiments, a work mode (e.g., a viewing mode, display mode, or other configurable work flow mode) may be selected, invoked, or changed based on whether the stylus is within a given distance of the tablet input device. In such embodiments, a given stylus gesture may be mapped (e.g., by a gesture mapping module of the natural media painting application) to one painting action in a given mode, and another painting action in another mode. Similarly, some stylus gestures may be mapped to different painting actions based on the context in which the gesture was made (e.g., whether it was made during a stroke, between strokes, while zoomed in, while zoomed out, etc.) Various examples of context-sensitive gestures and their mappings to paining actions are described below.

As illustrated in FIG. 4, the method may include the application determining the context of the stylus gesture (as in 440), and may determine the painting action that is mapped to the stylus gesture, dependent on the determined context (as in 450). The application may determine the work mode for the painting action (as in 460), based on one or more of the proximity of the stylus with respect to the tablet, one or more previous painting actions, the state of an image being created or edited, the currently selected viewing options, or other factors. Various examples of the modes in which a painting action may be applied are described below. Once the painting action and work mode have been determined, the method may include performing the painting action according to the determined mode, as in 470.

Figure 5A:
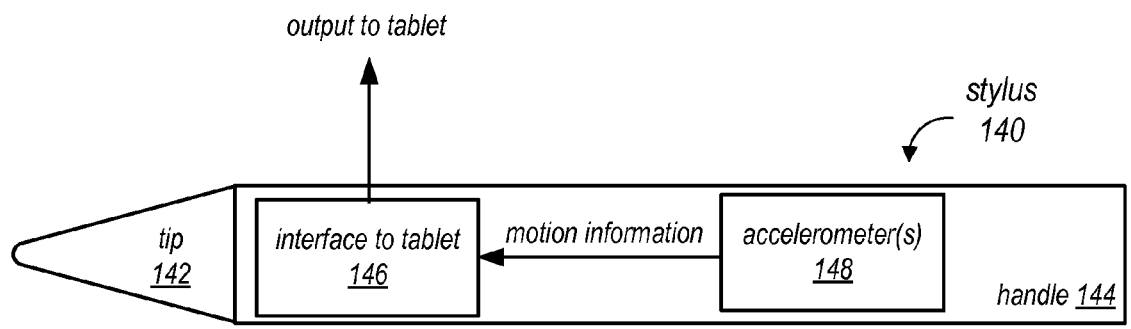
FIG. 5A illustrates various components of an example stylus, according to some embodiments.

FIG. 5A illustrates components of an example stylus 140 according to some embodiments. Stylus 140 may generally be described as having a tip 142 and a handle 144. Note that a stylus 140 may be provided with two tips instead of one as shown in FIG. 5A. Stylus 140 may include one or more accelerometers 148 and/or other components for sensing movement metrics including but not limited to spatial (location), directional, and acceleration metrics. This motion information may be communicated to a tablet, such as tablet 130 shown in FIGS. 1 and 2, via an interface 146. Interface 146 may typically be a wireless interface, although wired interfaces are possible.

In some embodiments, the natural media painting application may employ a brush model that simulates the use of a bristle brush, such as one represented by a brush tool that is manipulated using a stylus. In such embodiments, realistic brush behavior may be simulated in the painting application. In one embodiment, the brush behavior may be simulated substantially in real-time to deposit ink or paint onto a virtual canvas. A brush model may include a large set of discrete bristles. The bristles may comprise "virtual" bristles and may also be referred to herein as bristle representations. The simulated behavior of the brush may result in continuous strokes created by sweeping individual bristles into quadrilaterals. The brush model and brush behavior simulation may model the change of the shape of a brush tip during a stroking motion and the deposition of paint or ink resulting from the motion. By computing the effect of each bristle independently of other bristles, a faithful reproduction of how a real brush deposits paint or ink and changes shape during a stroke may be achieved.

Figure 5B:
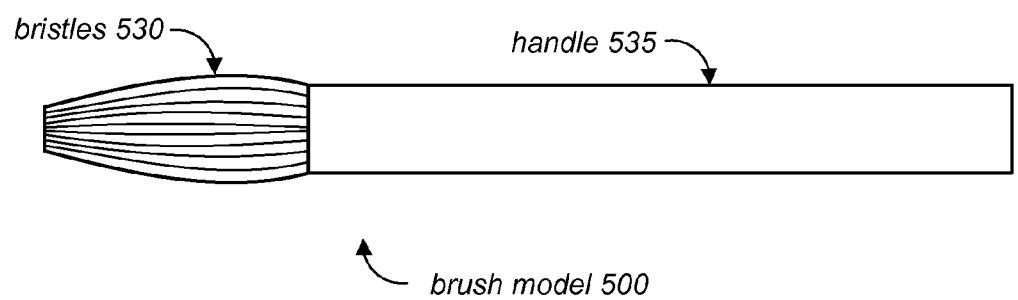
FIG. 5B illustrates a brush model, according to some embodiments.

FIG. 5B is a block diagram illustrating a simplified brush model according to one embodiment. In one embodiment, a brush may be simulated as a set of discrete "virtual" bristles. As shown in FIG. 5B, the brush model 500 may comprise a plurality of bristles 530. In one embodiment, the brush model may also comprise a brush handle 535. The plurality of bristles 530 may be attached to the end of the handle 535. In one embodiment, the bristles 530 may include a sufficient number of individual bristles (e.g., 50 to 100) for accurate simulation of the behavior of a real brush.

At least some of the stylus gestures that may be detected by a natural media painting application, such as the stylus gestures marked with an asterisk (*), may be performed using a stylus augmented with one or more accelerometers, and possibly other hardware and/or software, for collecting motion and other data to be used in gesture recognition. Stylus gestures that may be detected in various embodiments may include, but are not limited to:
  a) A barrel rotation (a twisting motion about the major axis of the stylus);
  b) A fanning motion (waving the stylus tip back and forth above the tablet);
  c) Mashing down (pressing the stylus into the tablet with high pressure);
  d) * A jerk up (a quick motion away from the tablet);
  e) * A jerk down (a quick motion toward the tablet);
  f) * Shaking away from the tablet (holding the stylus by its end and flicking the wrist); and
  g) * Shaking toward the tablet (holding the stylus its end and flicking the wrist).

Figure 6A:
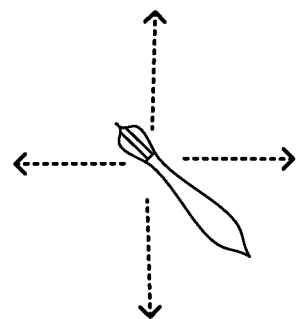
FIGS. 6A-6G illustrate various stylus gestures that may be recognized by an interface module of a natural media painting application, according to various embodiments.
Figure 6B:
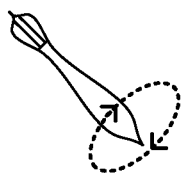
Figure 6C:
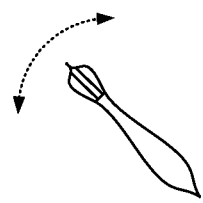
Figure 6D:
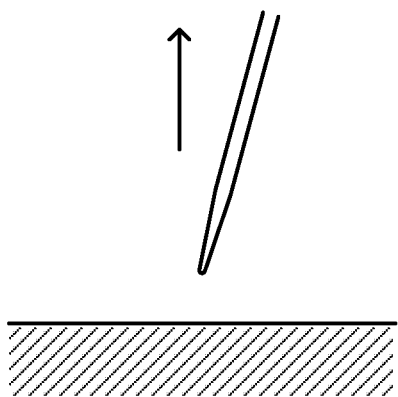
Figure 6E:
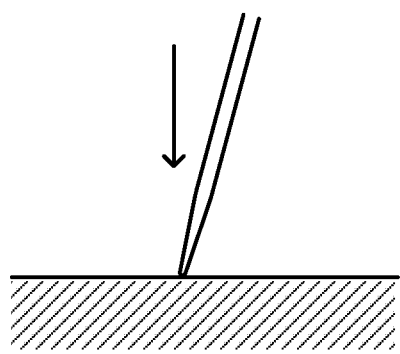
Figure 6F:
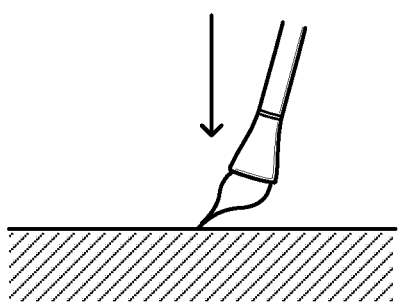
Figure 6G:
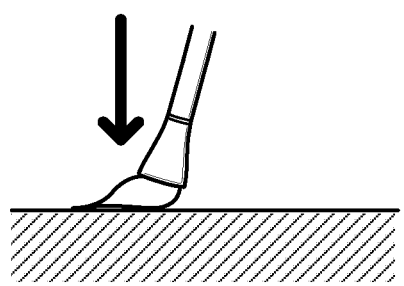

Some of the stylus gestures that may be recognized by an interface module of a natural media painting application, such as tablet/stylus input module 122 in FIG. 1, are illustrated in FIGS. 6A-6G, according to various embodiments. For example, FIG. 6A illustrates various translation gestures in which the stylus moves in a given direction (e.g., up/down, right/left, etc.) FIG. 6B illustrates a barrel rotation (e.g., a rotation about the major axis of the stylus). FIG. 6C illustrates a fanning motion, as described above. FIG. 6D illustrates a jerk up motion, and FIG. 6E illustrates a jerk down motion. FIGS. 6F and 6G illustrate the effects of different stylus gestures on a brush model, such as brush model 500 in FIG. 5B. For example, FIG. 6F illustrates the effect of a stylus gesture that corresponds to pressing a bristle brush lightly on a canvas, while FIG. 6G illustrates the effect of a stylus gesture that corresponds to mashing a bristle brush down into a canvas, as in (c) above. In general, tablet/stylus input module 122 may be configured to recognize a wide variety of stylus gestures by detecting manipulation of the stylus from an initial pose (e.g., an initial position and orientation) using six degrees of freedom (e.g., detecting movement in a given direction in three dimensions, rotation about an axis in any dimension, pitch, roll, yaw, etc.) As described herein, this 6DOF information may be augmented with information collected from an accelerometer, various proximity sensors, a touch and/or pressure sensitive tablet device, or other input mechanisms to define a stylus gesture that is mapped to an action to be taken in a natural media painting application, and the action mapped to the gesture may be dependent on a work mode and/or context in which the stylus gesture was made.

Figure 7:
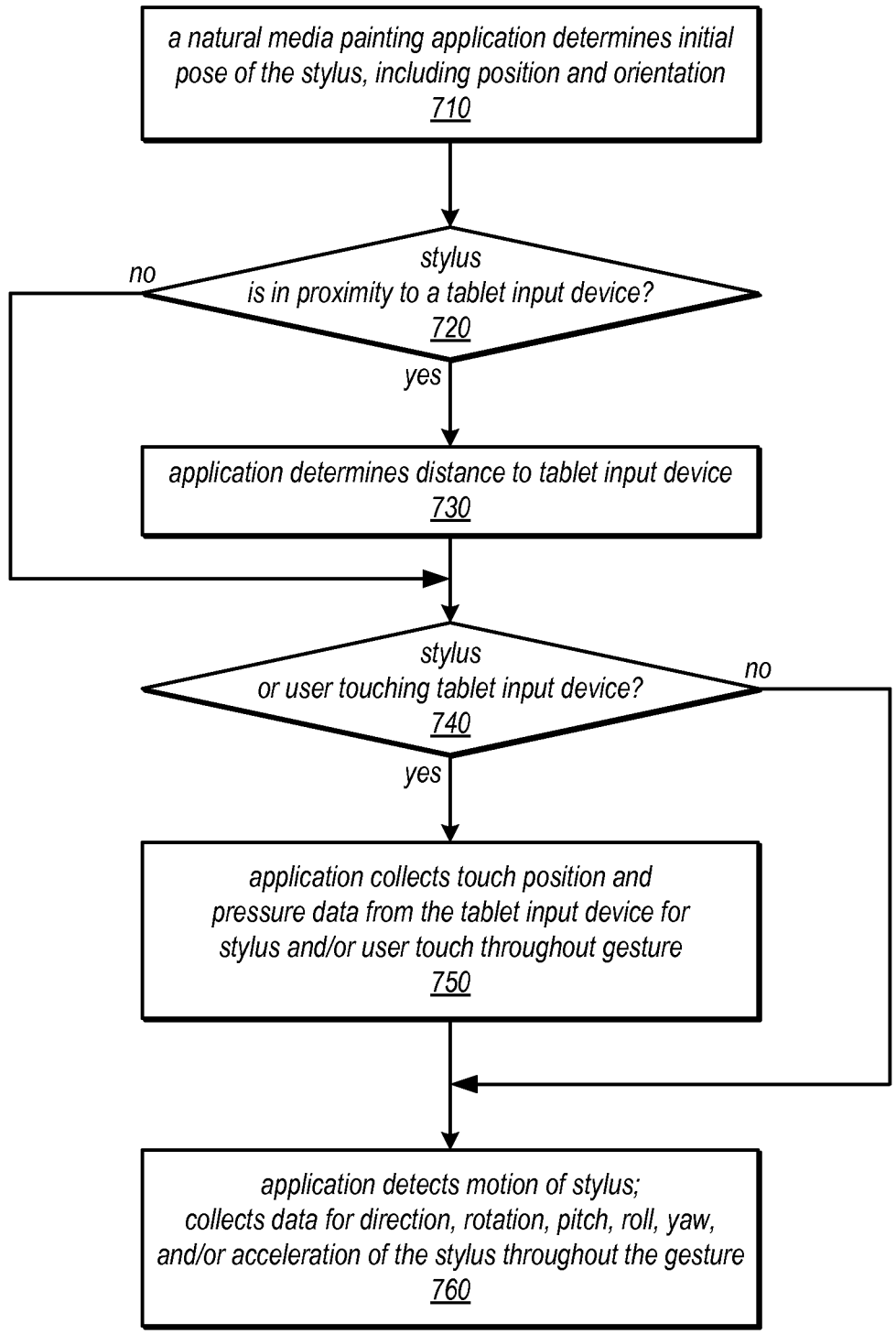
FIG. 7 is a flow diagram illustrating one embodiment of a method for collecting information used to determine a stylus gesture and map the gesture to a particular action to be taken in a natural media painting application.

FIG. 7 illustrates one embodiment of a method for collecting information used to determine a stylus gesture and map the gesture to a particular action to be taken in a natural media painting application. As illustrated in this example, the method may include a natural media painting application determining an initial pose of the stylus, including its position an orientation (as in 710). For example, in some embodiments, the stylus and/or a tablet input device may include sensors that allow the initiate pose of the stylus to be determined by an interface module, such as tablet/stylus input module 122. In other embodiments, the system may employ input from a camera that may be analyzed to determine the initial pose of the stylus.

If the stylus is in proximity to a tablet input device, shown as the positive exit from 720, the method may include the application determining the distance from the stylus to the tablet input device, as in 730. For example, in some embodiments, if the stylus is within a given distance from the tablet, sensors in the stylus and/or tablet may detect that the stylus is in proximity to the tablet. In other embodiments, the system may employ input from a camera that may be analyzed to determine whether the stylus is in proximity to the tablet. As described herein, some of the functions of the natural media painting device may be dependent on whether the stylus is in proximity to the tablet device or on a change in the proximity of the stylus with respect to the tablet device.

As illustrated at 740 in FIG. 7, the method may include determining whether the stylus and/or the user is touching the tablet input device (e.g., using a finger, fingernail, etc.). If so, shown as the positive exit from 740, the method may include the application collecting touch position and/or pressure data from the tablet input device for the stylus and/or the user touch throughout the gesture, as in 750. As illustrated in this example, the method may include the application detecting the motion of the stylus throughout the gesture, and collecting data related to any or all of a translation (i.e. a movement in a given direction), rotation, pitch, roll, yaw, and acceleration of the stylus during the gesture, as in 760.

Figure 8:
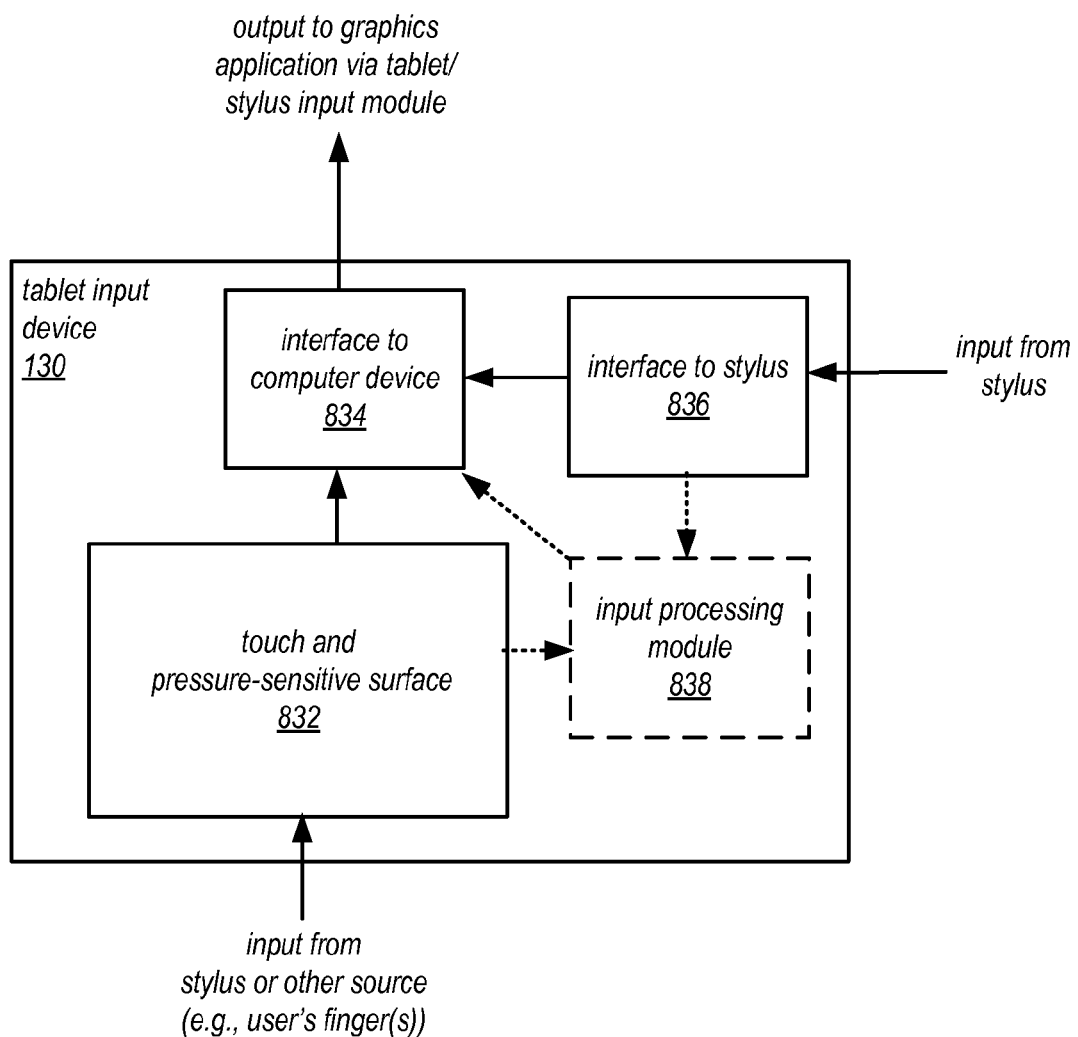
FIG. 8 illustrates various components of tablet input device, according to some embodiments.

FIG. 8 illustrates components of an example tablet input device according to some embodiments. As illustrated in this example, tablet 130 may include a touch and pressure-sensitive surface 832 that may be configured to detect contact with tip 142 of stylus 140, and/or contact with another object such as the user's fingertip or knuckle. Surface 832 may also be configured to detect motion on the surface, for example detecting the dragging of tip 142 of stylus 140 across the surface. Surface 832 may also be configured to detect the amount of pressure applied to the surface, e.g., by stylus 140, another object, or a user touch. Tablet 130 may also include an interface to stylus 836 that is configured to detect the position of, and motion of, stylus 140 in relation to tablet 130, for example by receiving input from stylus 140 via a wireless interface, or alternatively via one or more motion detectors integrated in or coupled to tablet 130 that are configured to track the motion and position of stylus 140. In some embodiments, tablet 130 and/or stylus 140 may include a camera, through which input about the position and/or motion of stylus 140 may be collected (not shown), or such a camera may included as an additional component of the system separate from tablet 130 and stylus 140. In some embodiments, tablet 130 may also include an input processing module 838 configured to process input received via interface to stylus 836 and/or surface 832.

Input processing module 838 may also include an interface to computer device 834. Interface 834 may be a wired or wireless interface. Interface 834 may be configured to communicate information collected from interface 836 and/or surface 832 to a computer device such as computer device 100 of FIG. 1. A graphics application on the computer device, such as graphics application 120 of FIG. 1, may interpret the information to detect various gestures and to perform various painting actions in response to the detected gestures for creating or editing the content of images, as described herein. In some embodiments, input processing module 838 may be configured to perform at least some of the functionality of detecting and/or recognizing various gestures. Thus, in some embodiments, tablet 130 may be configured to detect/recognize gestures and communicate the gestures to a graphics application via interface 834. The graphics application may then perform the appropriate painting actions in response to the gestures.

As described in more detail herein, the actions taken in response to a stylus gesture may include painting actions and/or work flow actions (e.g., changing a parameter of the work flow, work environment, viewing context, or another mode of the natural media painting application). For example, the painting actions that may be controlled by the stylus gestures in some embodiments may include, but are not limited to:

a) Sharpening the point of a brush by twisting, as defined for stylus gesture (a) above. As a brush dries, its tip may become split, and the stylus may thus no longer make a smooth line stroke. Sharpening the brush to a point restores the original shape of the brush.

b) Cleaning the brush by shaking it away from tablet, as defined for stylus gesture (f) above. As a brush is dragged through paint on the canvas, the tip dirties and the color changes. Cleaning the brush restores its original loaded color, or alternately, removes all paint.

c) Refilling the brush by jerking it down, as defined for stylus gesture (e) above. During a stroke, the brush may run out of paint. Refilling restores the originally loaded color.

d) Changing the tool by jerking it up, as defined for stylus gesture (d) above. Rapid switching between paintbrushes is thus enabled.

e) Drying the brush by fanning, as defined for stylus gesture (b). With a wet paintbrush, in order to make dry strokes the brush tip must first be dried. This is the opposite action of refilling the brush (c), which re-applies paint to the brush tip.

f) Splattering paint by shaking the brush toward tablet, as defined for stylus gesture (g) above. A wet brush tip will drip paint to make characteristic spattering effects.

g) Adding paint to the brush by tapping it in a paint well. When mixing colors, the artist may want to pick up some small amount of paint on the brush to adjust the mixed color.

h) Saturating the brush by mashing it in a paint well, as defined for stylus gesture (c) above. When loading the brush with paint before stroking, the artist may want to fill the entire brush tip with the selected color.

i) Homogenizing (i.e. mixing or blending) the colors of paint on the tip of the brush by twisting the brush, as defined for stylus gesture (a) above. When stroking across paint on the canvas, the brush tip dirties differently on different parts of the tip, which can create strokes of non-uniform color. Homogenizing the tip colors ensures strokes will be a single color, while retaining the dirty state.

j) Splitting the bristles of the brush tip by mashing the brush down, as defined for stylus gesture (c) above. To create scratchy strokes, the brush tip must first be split into separate clumps.

As previously noted, the stylus gestures and the mapping of these gestures to natural media painting actions, as provided by various embodiments, may provide advantages over conventional widget-based UIs for natural media painting for at least the reason that the stylus gestures and their applications in natural media painting may reduce the amount of time a user needs to execute workflow tasks (e.g., due to less hand travel, fewer clicks, etc.). Some embodiments may also reduce the cognitive load of the user for those tasks, since the gestures are aligned with pre-existing motor skills cultivated by traditional painting techniques, and since the gestures can be executed in-place with the artwork, which alleviates the need to shift focus away from the art to manipulate widgets.

In some embodiments, the system and methods described herein may provide gesture-based zooming. In conventional graphics applications, users generally cannot perform detailed, zoomed-in, pixel-level editing of an image, for example at 1:1 ratio, while at the same time displaying the entire image, as the resolution of most display devices is insufficient to display both representations at the same time. Conventionally, users may have to zoom in and out on the image, and may have to repeatedly toggle the screen mode from a windowed mode to a full screen mode. Thus, users typically perform pixel-level editing while zoomed-in on a small portion of the image displayed on the screen. After editing, the user must zoom out to view the changes in context of the entire image. These conventional pixel-level editing techniques require pushing a button, depressing a key sequence, or other user interactions to zoom in and out that complicate the workflow. In some embodiments of the systems and methods described herein, a particular stylus gesture may be mapped to a "zoom in" or "zoom out" function in the natural media painting application, in some contexts.

Figure 9:
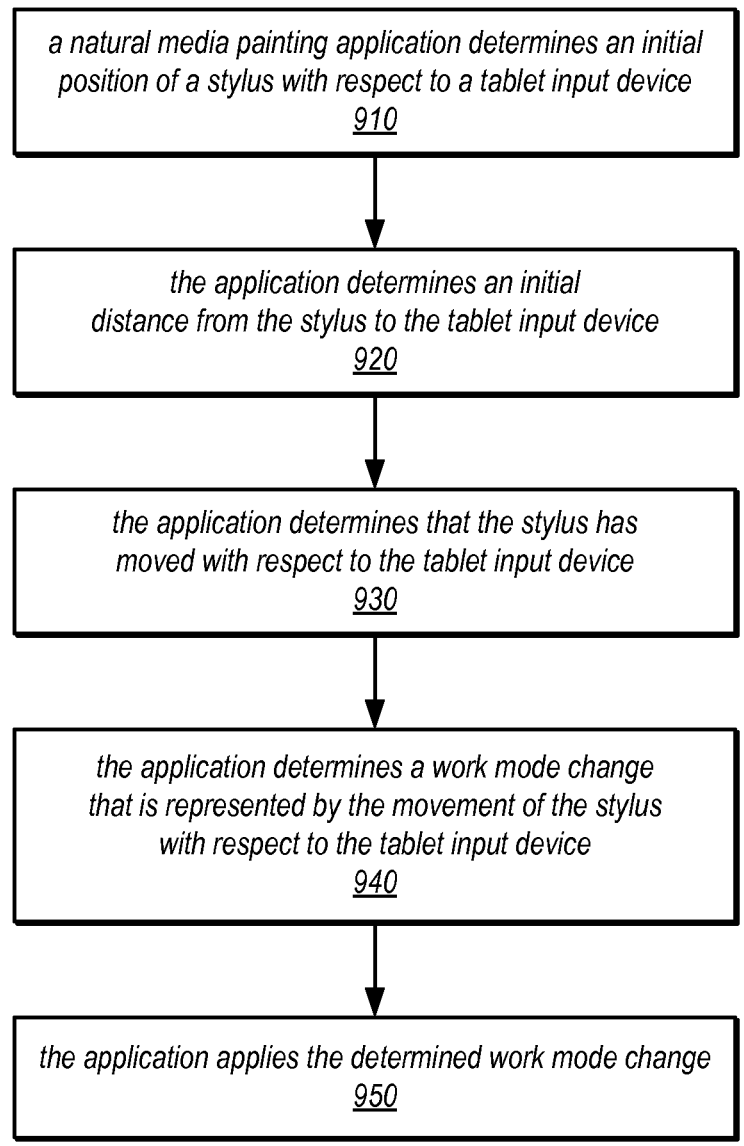
FIG. 9 is a flow diagram illustrating one embodiment of a method for performing proximity-based actions in a natural media painting application.

As noted above, in some embodiments, the system and methods described herein may perform various functions and/or operate in particular modes based on the proximity of a stylus with respect to a tablet input, or on a change in the proximity. One embodiment of a method for performing various proximity-based actions in a natural media painting application is illustrated in FIG. 9. As illustrated at 910, the method may include a natural media painting application determining an initial position of a stylus with respect to a tablet input device (e.g., using various sensors, input from a camera, etc). The method may also include determining an initial distance from the stylus to the tablet input device, as in 920. For example, in some embodiments, one or more sensors and/or cameras in the stylus, tablet device, or another component of the system may be used to determine the initial distance from the stylus to the tablet device. In some embodiments one or more sensing mechanisms in the tablet may detect that the stylus was or has recently moved within or beyond a given threshold distance. In some embodiments, the system may use two or more threshold distances to determine proximity with respect to the tablet. For example, different distance thresholds may be used in different proximity based gestures and/or their corresponding actions. These proximity distance thresholds may be pre-defined by the application, or may be configurable by the user (e.g. through an input mechanism in the user interface of the application), in different embodiments.

As illustrated at 930 in this example, the method may include determining that the stylus has moved with respect to the tablet input device, e.g., moving closer to or farther away from the tablet. In embodiments, the change in proximity may be detected even when the stylus does not touch the tablet in either or both of its position initial or its new position. As illustrated at 940, the method may include the application determining a work mode change that is represented by the movement of the stylus with respect to the tablet. For example, a change in the viewing mode or other work flow context may be mapped to a particular change in the proximity of the stylus, and may be based on an absolute change (e.g., with the stylus moving closer to or farther away from the tablet) and/or on the rate of change (e.g., whether the stylus moved quickly or slowly toward or away from the tablet). In response to determining a work mode change that is represented by the change in the proximity of the stylus, the application may apply the determined work mode change in the application, as in 950.

In some embodiments, the system and methods described herein may allow the use of a tablet and stylus to provide a "zoom when near" or "zoom for detail" function, referred to herein as a zoom function or auto zoom function, that simplifies the workflow for performing detailed editing that requires zooming into the image. In one embodiment, the auto zoom function may be provided as an option in a graphics application and/or as an option on a tablet/stylus. When the function is enabled, as the stylus is moved into proximity of the tablet, the application may zoom into a displayed image to focus on an area of interest; and the user may then perform appropriate detail edits, for example on individual pixels of the image. When the stylus is moved away from proximity to the tablet, the application may zoom out on the displayed image to, for example, fit the entire image on the display. In some embodiments, scaling factors (i.e. zoom levels) for the auto zoom function may be fixed. In other embodiments, scaling factors for the auto zoom function may be specified or changed via one or more user interface elements provided by or for the application, the tablet, and/or the stylus. In some embodiments, proximity of the stylus to the tablet may be determined by comparing a current location of the stylus to a pre-specified proximity threshold to at least one position on the tablet; if the current location of the stylus, or a portion of the stylus, is closer than the proximity threshold to the at least one position on the tablet, then the stylus is considered to be proximate to the tablet.

Figure 10:
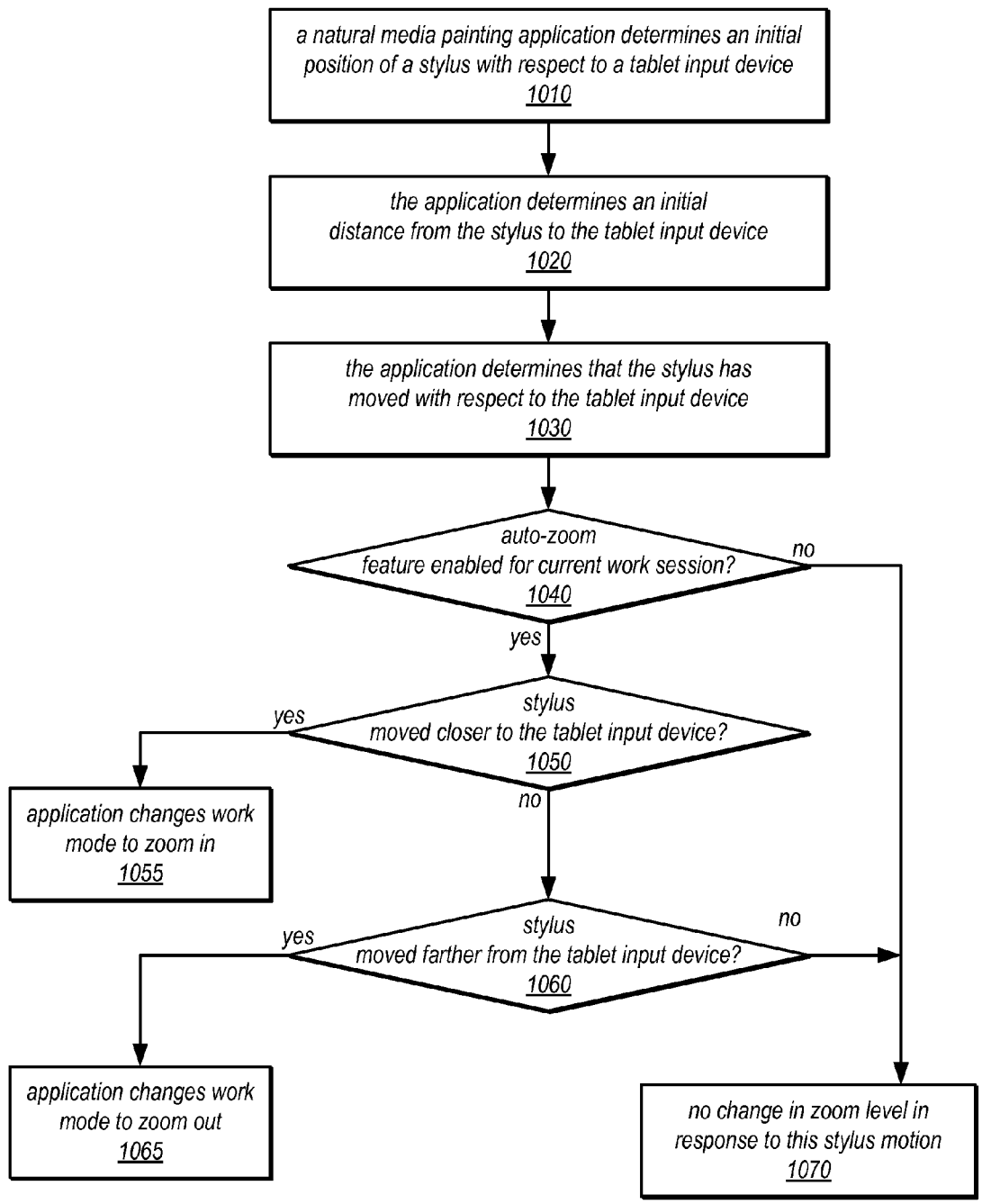
FIG. 10 is a flow diagram illustrating one embodiment of a method for performing a proximity-based zoom function in a natural media painting application.

One embodiment of a method for performing a proximity-based zoom function in a natural media painting application is illustrated in FIG. 10. As illustrated at 1010, the method may include a natural media painting application determining an initial position of a stylus with respect to a tablet input device (e.g., using various sensors, input from a camera, etc). The method may also include determining an initial distance from the stylus to the tablet input device, as in 1020. For example, in some embodiments, one or more sensors and/or cameras in the stylus, tablet device, or another component of the system may be used to determine the initial distance from the stylus to the tablet device.

As illustrated at 1030 in this example, the method may include determining that the stylus has moved with respect to the tablet input device, which may include the stylus moving closer to or farther away from the tablet. In some embodiments, a change in proximity may be detected even when the stylus does not touch the tablet in either or both of its position initial or its new position (e.g., using one or more sensors and/or cameras in the stylus, tablet device, or another component of the system). As illustrated in this example, if the auto zoom feature is not enabled for the current work session, shown as the negative exit from 1040, there may be no change in the zoom level in response to this stylus motion (as in 1070). For example, the auto zoom feature may in some embodiments be enabled by default. In other embodiments, this feature may be selectively enabled by the user (e.g., by selecting an "auto zoom" mode using the mode control mechanism in tools area 202 of FIG. 2).

If the auto zoom feature is enabled for the current work session, shown as the positive exit from 1040, the method may include determining whether the stylus moved closer to the tablet input device, as in 1050. In this example, if the stylus moved closer to the tablet input device, shown as the positive exit from 1050, the method may include the application changing the work mode to zoom in to an area of interest (e.g., a most recent work area, or an area above which the stylus hovers when brought closer to the tablet) to perform detailed editing work, as in 1055. If not, shown as the negative exit from 1050, the method may include the application determining whether the stylus moved farther away from the tablet, as in 1060. In this example, if the stylus moved farther away from the tablet input device, shown as the positive exit from 1060, the method may include the application changing the work mode to zoom out, e.g., to display a larger context for the painting operations in progress, as in 1065. In some embodiments, when zooming out using such an auto zoom feature, the application may display the entire image that is being created and/or edited. If the stylus has not moved farther away from the tablet, shown as the negative exit from 1060, there may be no change in the zoom level in response to this stylus motion (as in 1070). In other words, if the stylus has moved with respect to the tablet, but not in a direction that increased or decreased its distance to the tablet, there may be no change in the zoom level in response.

In addition to the zoom function, some embodiments may provide functionality that allows the user to pan the image when the stylus is in proximity to, but not touching, the tablet surface. In some embodiments, panning may be performed by motion of the stylus. In other embodiments, panning may be performed by holding the stylus in proximity to the tablet and manipulating another user input device such as a trackpad, trackball, joystick or mouse. In some embodiments, the image may be zoomed to a subwindow surrounding and tracking the stylus to thus provide a loupe-like function.

Figure 11:
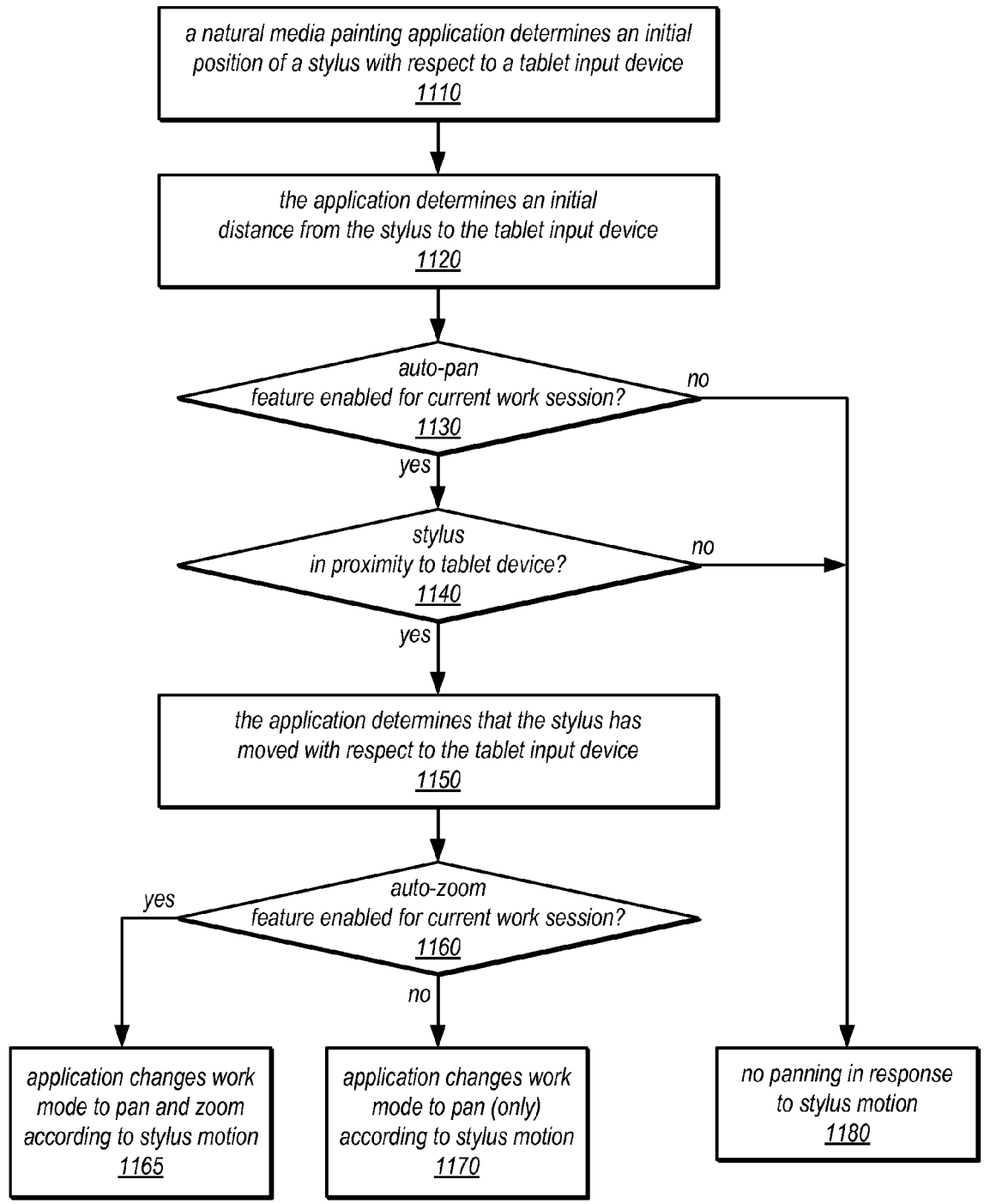
FIG. 11 is a flow diagram illustrating one embodiment of a method for performing a proximity-based panning function in a natural media painting application.

One embodiment of a method for performing a proximity-based panning function in a natural media painting application is illustrated in FIG. 11. As illustrated at 1110, the method may include a natural media painting application determining an initial position of a stylus with respect to a tablet input device (e.g., using various sensors, input from a camera, etc.). The method may also include determining an initial distance from the stylus to the tablet input device, as in 1120. For example, in some embodiments, one or more sensors and/or cameras in the stylus, tablet device, or another component of the system may be used to determine the initial distance from the stylus to the tablet device.

As illustrated at 1130 in this example, the method may include determining whether an auto pan feature is enabled for the current work session. If not, shown as the negative exit from 1130, there may be no panning performed in response to this stylus motion (as shown in 1180). For example, the auto pan feature may in some embodiments be enabled by default. In other embodiments, this feature may be selectively enabled by the user (e.g., by selecting an "auto pan" mode using the mode control mechanism in tools area 202 of FIG. 2).

If the auto pan feature is enabled for the current work session, shown as the positive exit from 1130, the method may include the application determining whether the stylus is in proximity to the tablet device, as in 1140. In other words, the method may include the application determining if the determined distance between the stylus and the tablet is within a given threshold distance for performing proximity-based panning. As previously noted, in some embodiments, a single threshold may be defined for the performance of proximity-based actions, while in other embodiments, a different threshold may be defined for each of a plurality of proximity-based actions, or for the used of proximity-based actions in different contexts. These thresholds may be predefined or may be configurable by the user (e.g., through a parameter setting mechanism of controls area 204 in FIG. 2), in different embodiments. If the stylus is not in proximity to the tablet device (e.g., according to a threshold for proximity-based panning), shown as the negative exit from 1140, there may be no panning performed in response to this stylus motion (as shown in 1180).

If the stylus is in proximity to the tablet device (e.g., according to a threshold for proximity-based panning), shown as the positive exit from 1140, the method may include determining that the stylus has moved with respect to the tablet input device, e.g., moving closer to or farther away from the tablet (as in 1150). In some embodiments, a change in proximity may be detected even when the stylus does not touch the tablet in either or both of its position initial or its new position (e.g., using various sensors, input from a camera, etc.). In some embodiments, an auto pan feature may be used in conjunction with an auto zoom feature, e.g., to allow a user to zoom and pan to or from a particular area of interest in one motion. As illustrated in this example, if an auto zoom feature is also enabled for the current work session, shown as the positive exit from 1160, the method may include the application changing the work mode to pan and zoom according to the stylus motion, as in 1165. For example, if the stylus moved closer to the tablet input device and to the right, the application may change the work mode to zoom in to an area of interest that is centered to the right of the area previously centered in the display in order to perform detailed editing work in that area. If the stylus moved farther away from the tablet and to the left, the application may change the work mode to zoom out to display a larger context for the painting operations in progress centered on an area to the left of the area previously centered in the display. In other embodiments, when zooming out using an auto zoom feature, the application may display the entire image that is being created and/or edited, regardless of any panning motion made by the stylus.

If an auto zoom feature is not enabled for the current work session, shown as the negative exit from 1160, the method may include the application changing the work mode to pan according to the stylus motion, as in 1170. For example, if the stylus moved up and to the right, the application may change the work mode such that the display is centered on an area that is above and to the right of the area previously centered in the display in order to view and/or perform editing work on the portion of the image in that area. If the stylus moved down and to the left, the application may change the work mode such that the display is centered on an area that is below and to the left of the area previously centered in the display in order to view and/or perform editing work on the portion of the image in that area.

Figure 12A:
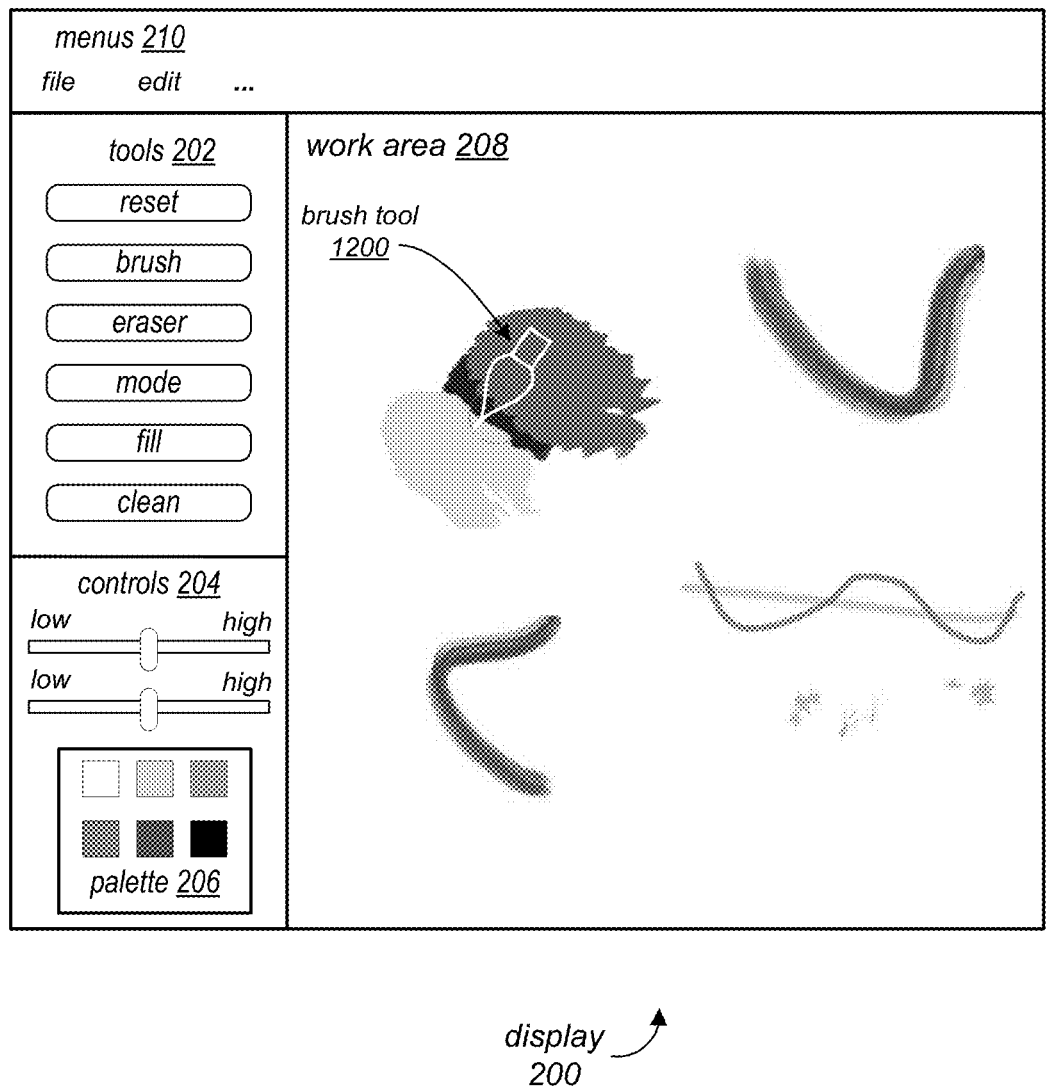
FIGS. 12A-12B illustrate a proximity-based zooming operation in a natural media painting application, according one some embodiments.
Figure 12B:
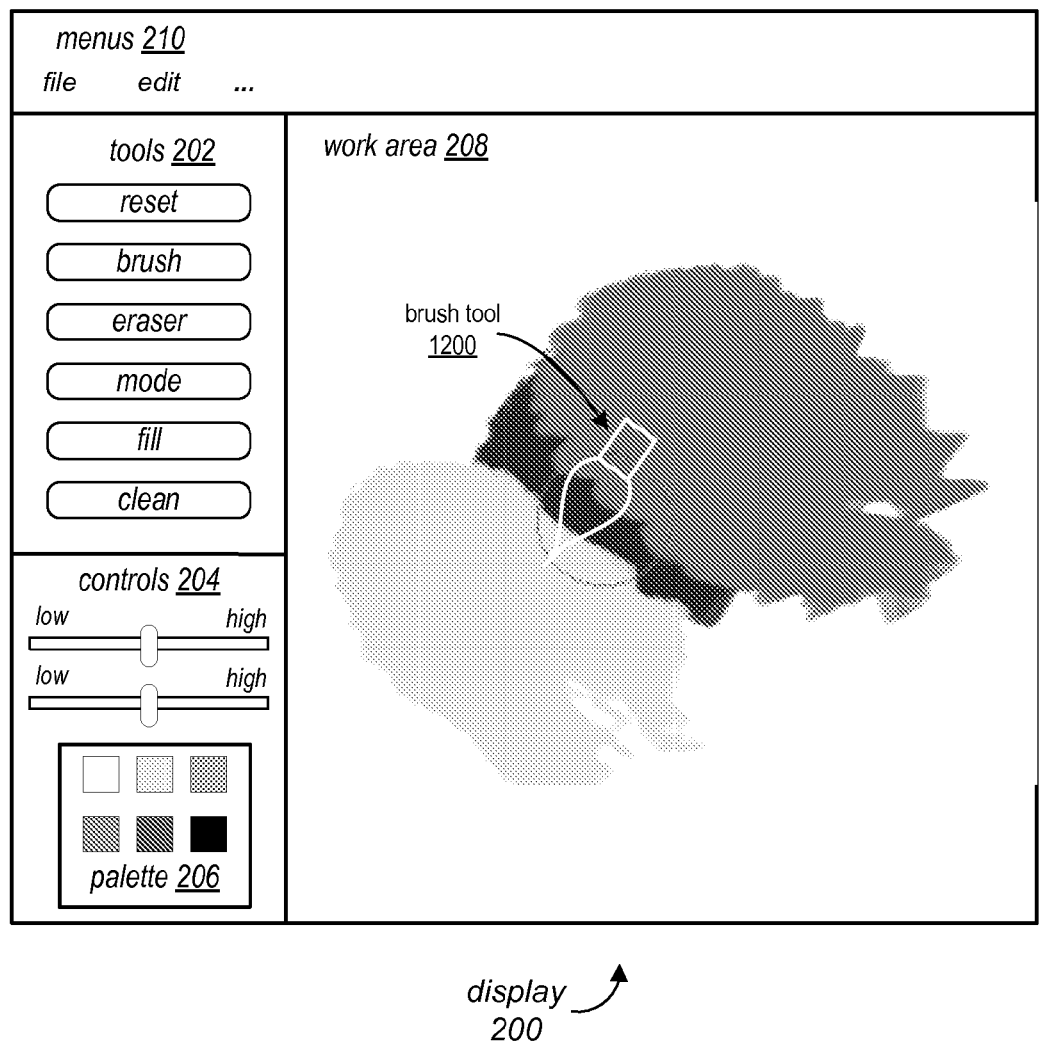
Figure 13A:
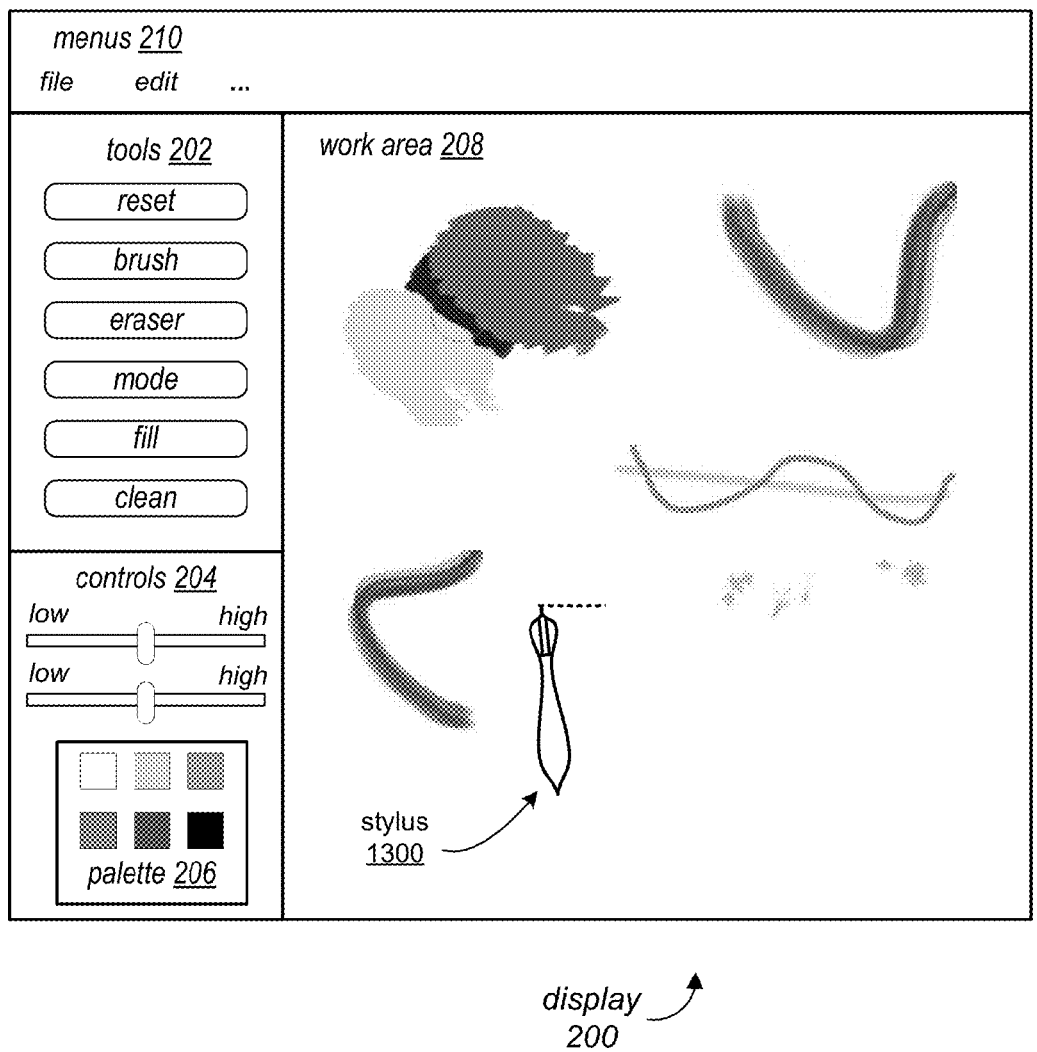
FIGS. 13A-13B illustrate a proximity-based panning operation in a natural media painting application, according one some embodiments.
Figure 13B:
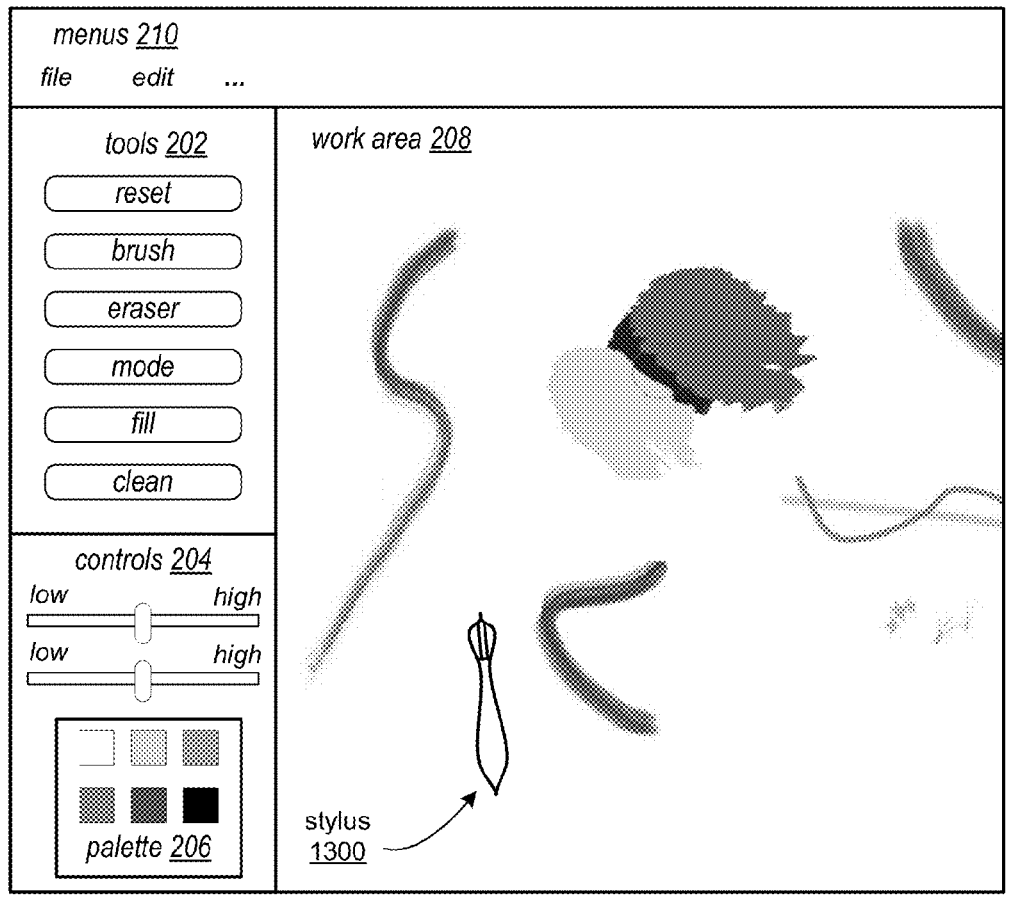

The proximity-based zooming and panning operations described above may be further illustrated by way of the example displays depicted in FIGS. 12A-12B and FIGS. 13A-13B. These figures illustrate an image being edited in a natural media painting application, according to one embodiment. FIG. 12A illustrates a display 200 of a natural media painting application in which an image being edited is displayed in work area 208. In this example, a stylus representing brush tool 1200 is moved closer to a tablet input device, such as tablet 130 described herein, while the application is in an auto zoom mode. In response to the stylus movement, the application zooms in on the area around brush tool 1200, as shown in FIG. 12B. FIG. 13A illustrates a display 200 of a natural media painting application in which an image being edited is displayed in work area 208. In this example, a stylus representing brush tool 1300 is moved to the right (as indicated by the dashed arrow point to the right) while hovering over (and while in proximity to) a tablet input device, such as tablet 130 described herein, while the application is in an auto pan mode. In response to the stylus movement, the application pans to the right of the area over which where brush tool 1300 was displayed, and the resulting display is shown in FIG. 13B.

At least some tablets have a touch-sensitive surface in addition to the ability to detect stylus manipulations. Some embodiments may use a touch-and-stylus combination gesture to provide one or more functions or modes. In some embodiments, two or more such functions or modes may be provided as options via a user interface so that the user may select among the two or more functions or modes enabled by the touch-and-stylus gesture. Modes provided via the touch-and-stylus gesture may include, but are not limited to, zoom mode, pan mode, steady detail work mode, and snap to grid mode.

Figure 14:
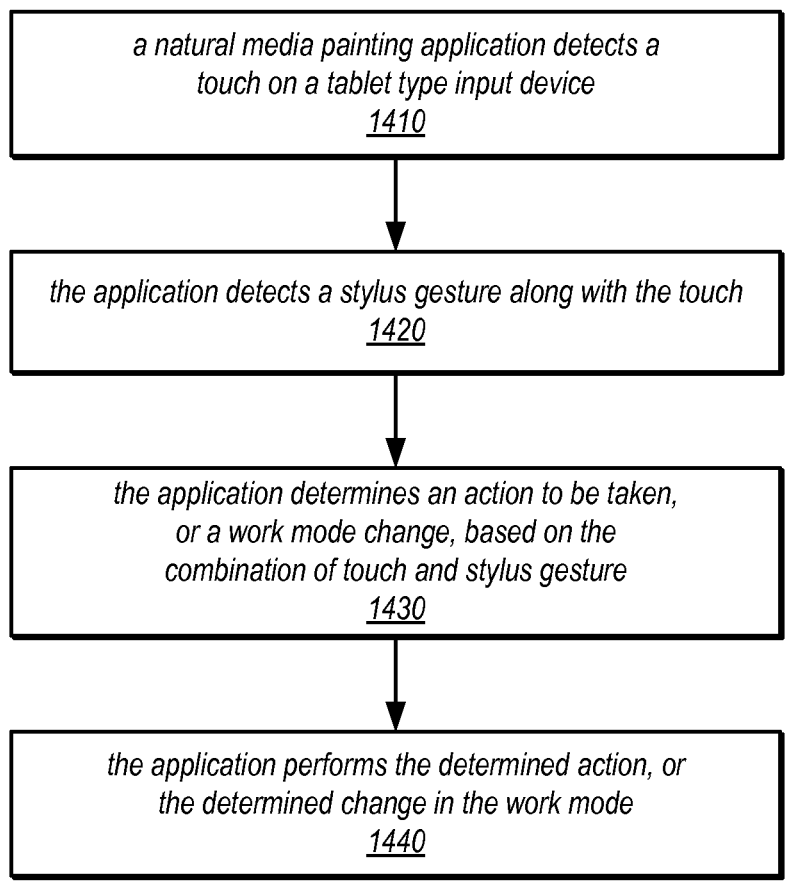
FIG. 14 is a flow diagram illustrating one embodiment of a method for performing various actions in a natural media painting application using touch-and-stylus combination gestures.

One embodiment of a method for performing various actions in a natural media painting application using touch-and-stylus combination gestures is illustrated in FIG. 14. As illustrated in this example, the method may include the application detecting a touch on a tablet type input device, as in 1410. For example, the tablet may be configured to detect the position of and the force applied by a stylus, fingertip, fingernail, hand or other object that touches the tablet device. As illustrated at 1420 in FIG. 14, the method may include the application detecting (and recognizing) a stylus gesture that is performed coincident with the detected touch. For example, a tablet/stylus input module 122 of graphics application 120 illustrated in FIG. 1 may be configured to detect a variety of stylus gestures including, but not limited to, those described herein.

In response to detecting a touch on a tablet coincident with detecting a detecting a stylus gesture, the application may determine an action to be taken, or a work mode change, based on the combination of the detected touch and the detected stylus gesture, as in 1430. For example, in some embodiments a touch-and-stylus gesture may be used to invoke a change in the work mode, such as an automatic zoom mode, automatic panning mode, steady detail work mode, or snap to grid mode, or a touch-and-stylus gesture may trigger adaptation of one or more parameters of the application to assist a user in performing a detected painting operation in progress. As illustrated at 1440 in FIG. 14, the method may include the application performing the determined action or the determined work mode change.

Figure 15A:
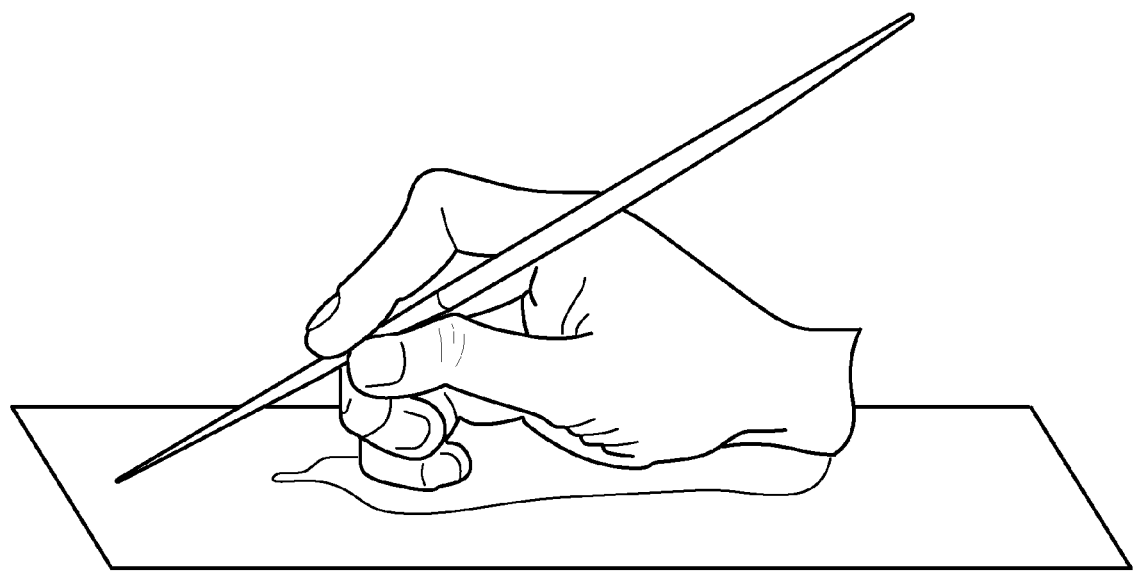
FIGS. 15A-15B illustrate examples of touch-and-stylus gestures, according to some embodiments.
Figure 15B:
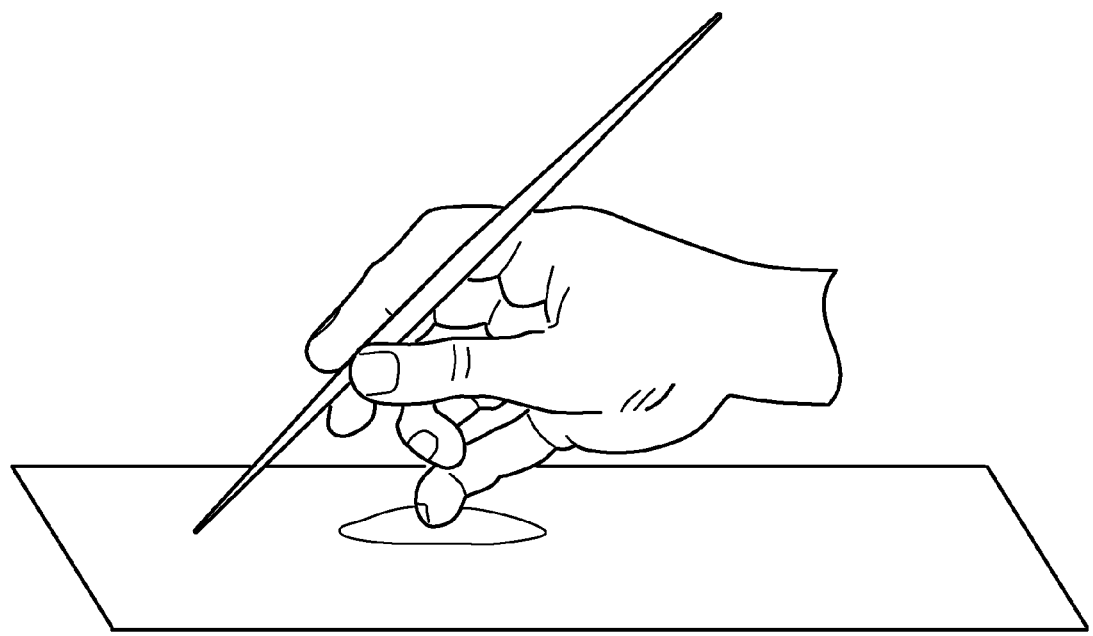

The touch-and-stylus gesture involves the user touching the surface of the tablet with a fingertip, knuckle, fingernail, etc. When the position of the stylus is detected to be in proximity to the tablet, the function provided by the selected mode (or a default mode) may be performed. For example, a user may use this touch-and-stylus gesture to zoom in or out on an image or pan the image. Another mode that may be provided is a "steady detail work" mode that dampers user motions of the stylus to provide steadier, smoother input. Examples of two such touch-and-stylus gestures are illustrated in FIGS. 15A and 15B. FIG. 15A illustrates a combination gesture in which a user is touching the surface of a tablet with the side of his hand (e.g. to steady his hand) while making a gesture with the stylus above the surface of the tablet. In one embodiment, such a combination gesture may be used to invoke a "steady detail work" mode, as described above. FIG. 15B illustrates a combination gesture in which a user is touching the surface of a tablet with the tip of his finger while making a gesture with the stylus above the surface of the tablet. In one embodiment, such a combination gesture may be used to invoke a snap to grid mode.

In some embodiments, in response to a touch-and-stylus gesture, a natural media painting application may recognize a particular painting operation in progress and may adapt or adjust one or more work flow, environment, and/or user input parameters in order to assist the user in completing the painting operation. For example, if a tablet-stylus input module 122 of a graphics application 120 detects and recognizes a combination gesture in which a user steadies his hand by touching the side of his hand to the tablet while moving the stylus steadily in one direction (as if to draw a straight line), the application may responsively adjust a damping factor of the user input mechanism, enable a snap to grid mode, or invoke a line tool in order to assist the user in drawing a straight line. Similarly, if a tablet/stylus input module 122 of a graphics application 120 detects and recognizes a combination gesture in which a user steadies his hand by touching his fingernail to the tablet while moving the stylus in a fanning motion (as if to draw an arc), the application may responsively adjust a damping factor of the user input mechanism, disable a snap to grid mode, or invoke an arc tool in order to assist the user in drawing an arc. In another example, tablet/stylus input module 122 of a graphics application 120 may detect and recognize a combination gesture that suggests the user is tracing an image, and the application may enable an edge detection function to assist the user in tracing the image.

Figure 16:
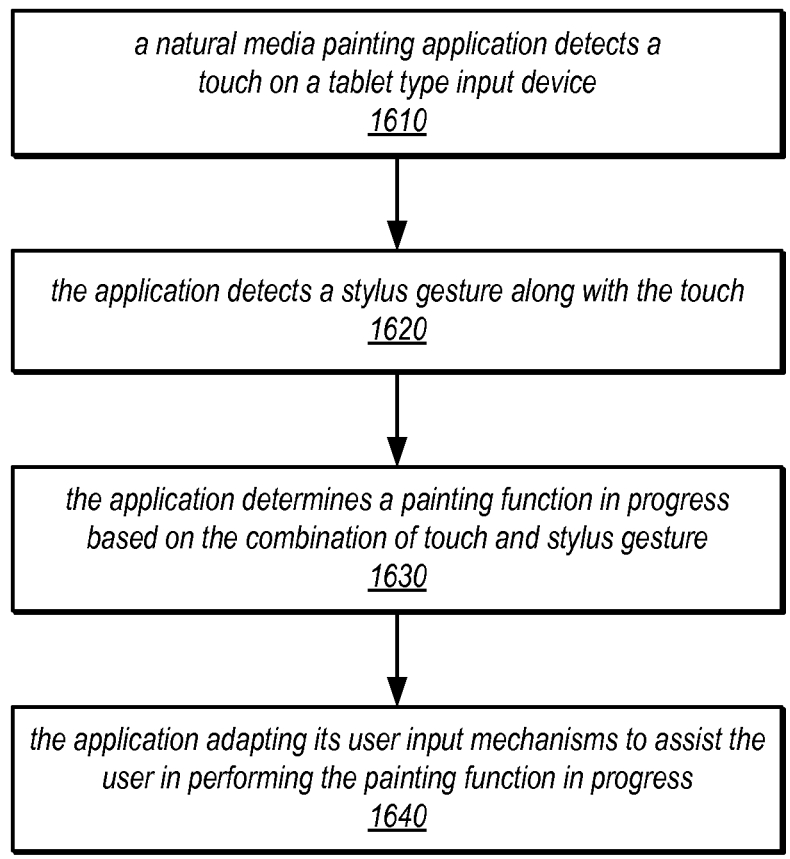
FIG. 16 is a flow diagram illustrating one embodiment of a method for using a touch-and-stylus gesture to assist in performing a painting operation in a natural media painting application.

One embodiment of a method for using a touch-and-stylus gesture to assist a user in performing a painting operation in a natural media painting application is illustrated in FIG. 16. As illustrated in this example, the method may include the application detecting a touch on a tablet type input device, as in 1610. For example, the tablet may be configured to detect the position of and the force applied by a stylus, fingertip, fingernail, hand or other object that touches the tablet device, and to convey that information to a tablet/stylus input module, such as tablet/stylus input module 122 of graphics application 120. As illustrated at 1620 in FIG. 16, the method may include the application detecting (and recognizing) a stylus gesture performed coincident with the detected touch. For example, a tablet/stylus input module 122 of graphics application 120 illustrated in FIG. 1 may be configured to detect a variety of stylus gestures including, but not limited to, those described herein. In other embodiments, a touch-and-stylus combination gesture may include a user touch in combination with a motion made by the stylus while the stylus is also touching the tablet. In such embodiments, in addition to detecting the motion of the stylus (e.g., through various sensors of the tablet or via a motion detector and/or accelerometer of the stylus), the combination gesture may be further defined by detecting the pressure applied to the tablet by the stylus during the gesture.

In response to detecting a touch on a tablet coincident with detecting a detecting a stylus gesture, the application may determine that a particular painting function is in progress, based on the combination of the detected touch and the detected stylus gesture, as in 1630. For example, the combination gesture may suggest that the user is drawing a line or an arc, or is tracing an image, as described herein. As illustrated at 1640 in FIG. 16, the method may include the application adapting one or more of its user input mechanisms (or parameters thereof) in order to assist the user in performing the detected painting function in progress.

Figure 17A:
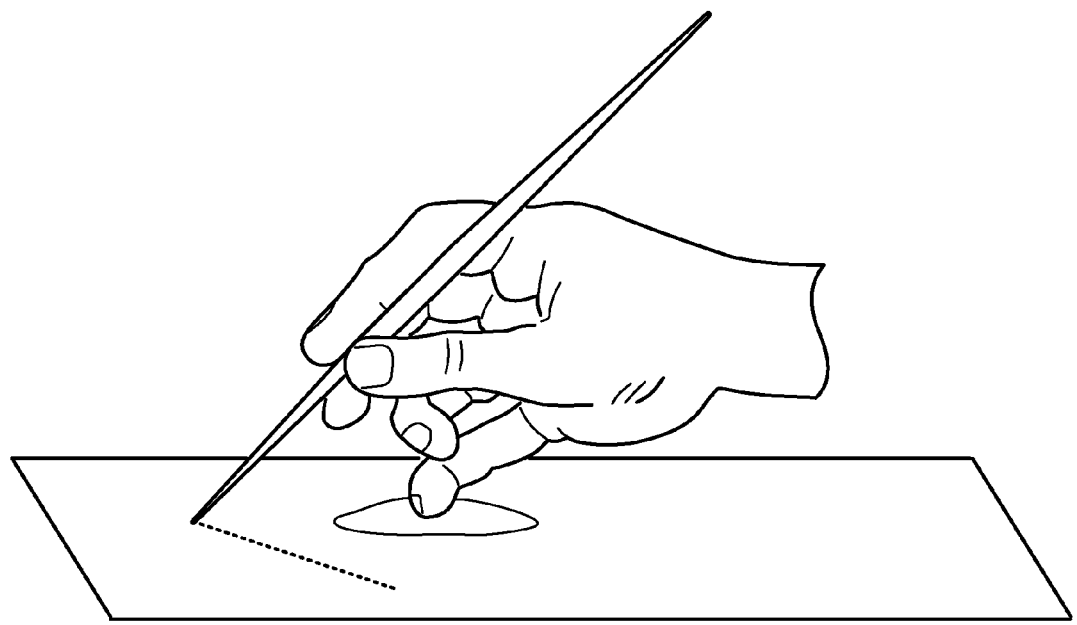
FIGS. 17A-17B illustrate examples of touch-and-stylus gestures that may be used to assist in performing a painting operation, according to some embodiments.
Figure 17B:
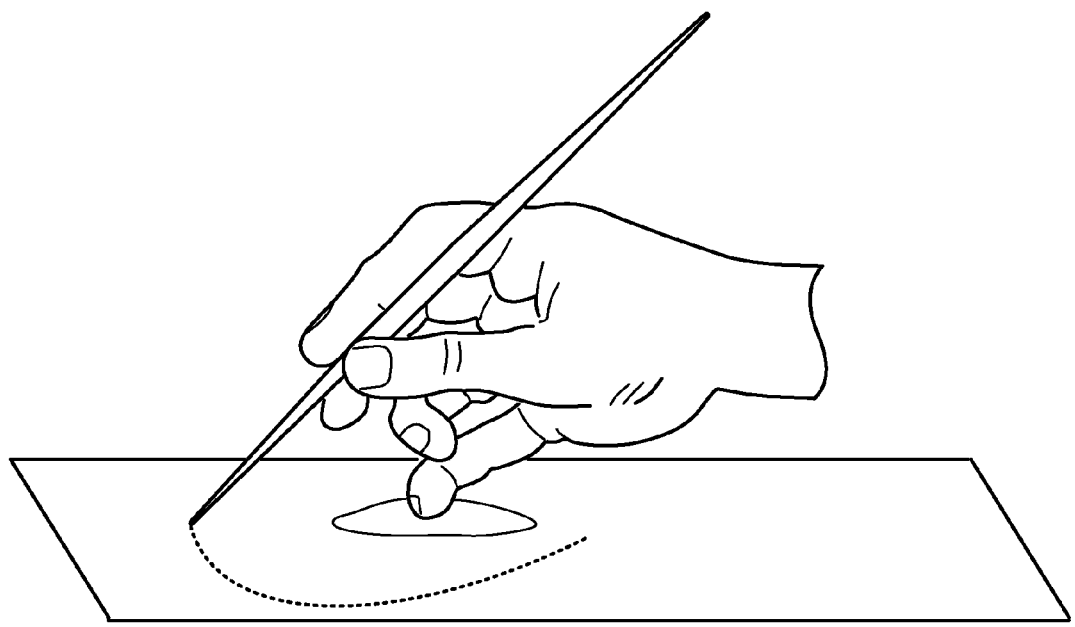
Figure 18:
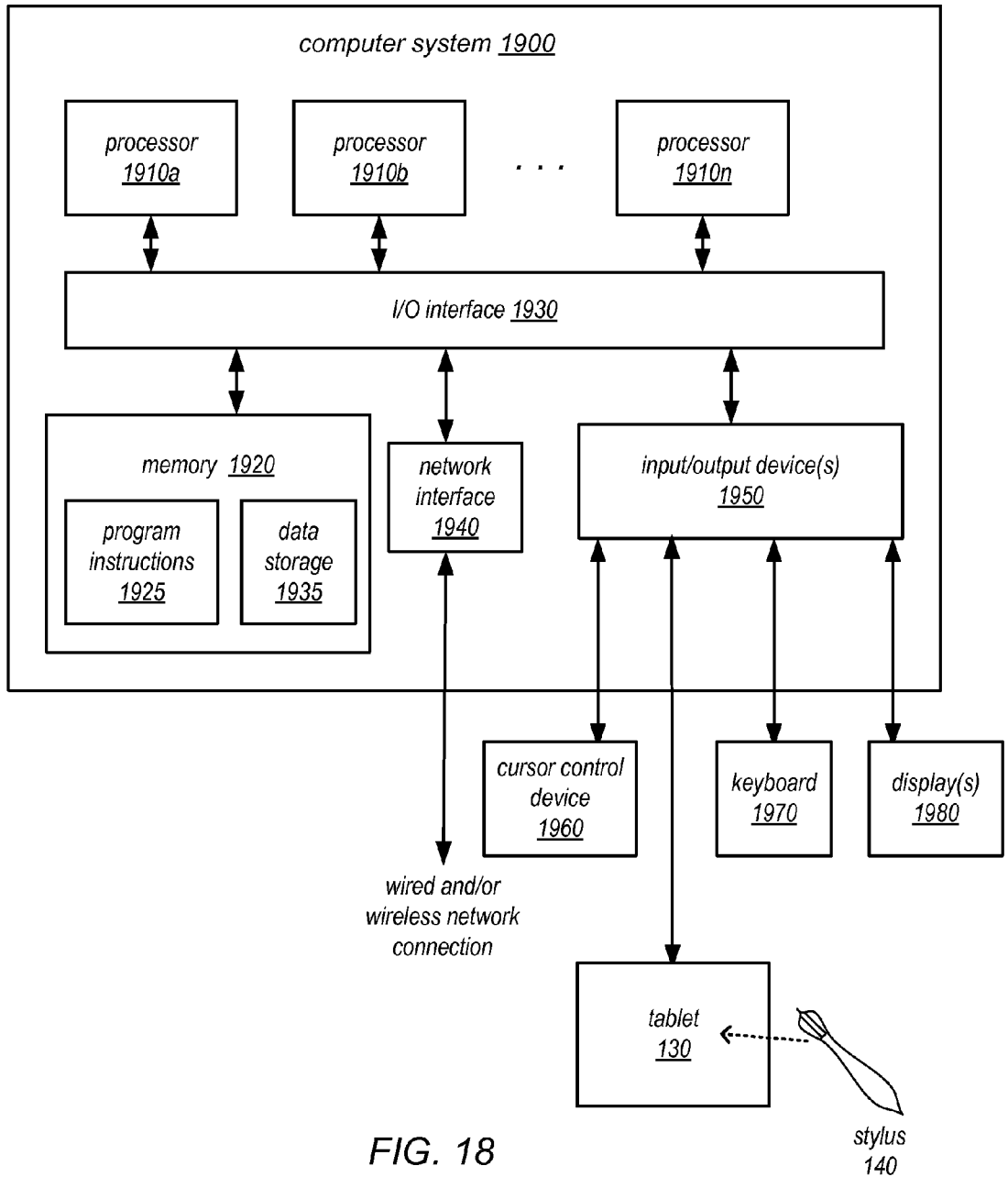
FIG. 18 is a block diagram illustrating an example computer system that may be used to implement the natural media painting application methods described herein, according to some embodiments.

Examples of two such touch-and-stylus gestures that may be used to assist a user in performing a painting operation are illustrated in FIGS. 17A and 17B. FIG. 17A illustrates a combination gesture in which a user is touching the surface of a tablet with his fingertip while moving the stylus steadily along the tablet in one direction (as if to draw a straight line). As described above, a natural media painting application that implements the methods described herein may responsively adjust various parameters of a work mode or user input mechanism in order to assist the user in drawing the straight line. FIG. 17B illustrates a combination gesture in which a user is touching the surface of a tablet with his fingertip while making a moving the stylus along the tablet in a fanning motion (as if to draw an arc). In some embodiments, the natural media painting application described herein may responsively adjust various parameters of a work mode or user input mechanism in order to assist the user in drawing the arc.

Some embodiments may include a means for detecting gestures made using a stylus, a tablet type input device, and/or a combination of a stylus and a tablet type input device. For example, a tablet/stylus input module may present an interface through which various gestures representing actions to be taken in a natural media painting application (e.g., mode changes and/or painting operations) may be detected (e.g., using collected motion information, pressure data, etc.) and recognized, and may generate and store data representing the detected gestures for use in various image editing operations in the natural media painting application, as described herein. The tablet/stylus input module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform presenting an interface through which various gestures may be detected and recognized, detecting and recognizing those gestures, and generating and storing data representing those gestures for subsequent use in the natural media painting application, as described herein. Other embodiments of the tablet/stylus input module may be at least partially implemented by hardware circuitry and/or firmware stored, for example, in a non-volatile memory.

Some embodiments may include a means for mapping detected gestures made using a stylus and/or tablet type input device to various functions of a natural media painting application. For example, a gesture mapping module may receive input specifying various gestures that have been detected, may determine actions to be taken in a natural media painting application (e.g., image editing operations to be performed using a brush tool in the application, or mode changes to be applied in the application) in response to that input, and may generate and store data representing the actions to be taken in the natural media painting application, as described herein. The gesture mapping module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input specifying various gestures that have been detected, determining actions to be taken in a natural media painting application in response to that input, and generating and storing data representing the actions to be taken in the natural media painting application, as described herein. Other embodiments of the gesture mapping module may be at least partially implemented by hardware circuitry and/or firmware stored, for example, in a non-volatile memory.

Some embodiments may include a means for simulating the behavior of a bristle brush in a natural media painting application. For example, a painting simulation module (which may include a bristle brush model), may receive input specifying various painting actions to be performed in a natural media painting application (e.g., image editing operations to be performed using a brush tool in the application) in response to tablet and/or stylus input, and may generate and store data representing an image that has been modified by the various image editing operations in the natural media painting application, as described herein. The painting simulation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input specifying various painting actions to be performed in a natural media painting application (e.g., image editing operations to be performed using a brush tool in the application) in response to tablet and/or stylus input, and generating and storing data representing an image that has been modified by the various image editing operations in the natural media painting application, as described herein. Other embodiments of the painting simulation module may be at least partially implemented by hardware circuitry and/or firmware stored, for example, in a non-volatile memory.

Example Computer System

The methods illustrated and described herein may be executed on one or more computer systems, which may interact with other devices, according to various embodiments. One such computer system is illustrated in FIG. 19. In the illustrated embodiment, computer system 1900 includes one or more processors 1910 coupled to a system memory 1920 via an input/output (I/O) interface 1930. Computer system 1900 further includes a network interface 1940 coupled to I/O interface 1930, and one or more input/output devices 1950, such as cursor control device 1960, keyboard 1970, audio device 1990, and display(s) 1980. Input/output devices 1950 include a tablet 130 and stylus 140 for enabling natural media painting using a realistic brush and tablet stylus gestures as described herein. In some embodiments, it is contemplated that embodiments may be implemented using a single instance of computer system 1900, while in other embodiments multiple such systems, or multiple nodes making up computer system 1900, may be configured to host different portions or instances of embodiments. For example, in one embodiment some elements may be implemented via one or more nodes of computer system 1900 that are distinct from those nodes implementing other elements.

In various embodiments, computer system 1900 may be a uniprocessor system including one processor 1910, or a multiprocessor system including several processors 1910

(e.g., two, four, eight, or another suitable number). Processors 1910 may be any suitable processor capable of executing instructions. For example, in various embodiments, processors 1910 may be general-purpose or embedded processors implementing any of a variety of instruction set architectures (ISAs), such as the x86, PowerPC, SPARC, or MIPS ISAs, or any other suitable ISA. In multiprocessor systems, each of processors 1910 may commonly, but not necessarily, implement the same ISA.

In some embodiments, at least one processor 1910 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1920 may be configured to store program instructions and/or data accessible by processor 1910. In various embodiments, system memory 1920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1920 as program instructions 1925 and data storage 1935, respectively. In other embodiments, program instructions and/or data may be received, sent or stored upon different types of computer-accessible media or on similar media separate from system memory 1920 or computer system 1900. Generally speaking, a computer-accessible medium may include storage media or memory media such as magnetic or optical media, e.g., disk or CD/DVD-ROM coupled to computer system 1900 via I/O interface 1930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1940.

In one embodiment, I/O interface 1930 may be configured to coordinate I/O traffic between processor 1910, system memory 1920, and any peripheral devices in the device, including network interface 1940 or other peripheral interfaces, such as input/output devices 1950, including tablet 130 and stylus 140. In some embodiments, I/O interface 1930 may perform any necessary protocol, timing or other data transformations to convert data signals from one component (e.g., system memory 1920) into a format suitable for use by another component (e.g., processor 1910). In some embodiments, I/O interface 1930 may include support for devices attached through various types of peripheral buses, such as a variant of the Peripheral Component Interconnect (PCI) bus standard or the Universal Serial Bus (USB) standard, for example. In some embodiments, the function of I/O interface 1930 may be split into two or more separate components, such as a north bridge and a south bridge, for example. In addition, in some embodiments some or all of the functionality of I/O interface 1930, such as an interface to system memory 1920, may be incorporated directly into processor 1910.

Network interface 1940 may be configured to allow data to be exchanged between computer system 1900 and other devices attached to a network, such as other computer systems, or between nodes of computer system 1900. In various embodiments, network interface 1940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1950 may, in some embodiments, include one or more display terminals, keyboards, keypads, touchpads, scanning devices, voice or optical recognition devices, tablets and stylus, or any other devices suitable for entering or retrieving data by one or more computer system 1900. Multiple input/output devices 1950 may be present in computer system 1900 or may be distributed on various nodes of computer system 1900. In some embodiments, similar input/output devices may be separate from computer system 1900 and may interact with one or more nodes of computer system 1900 through a wired or wireless connection, such as over network interface 1940.

As shown in FIG. 19, memory 1920 may include program instructions 1925, configured to implement embodiments of methods as illustrated and described in the accompanying description, and data storage 1935, comprising various data accessible by program instructions 1925. In one embodiment, program instructions 1925 may include software elements of methods as illustrated and described in the accompanying description, including a tablet/stylus input module, painting simulation module, bristle brush model, and/or gesture mapping module. Data storage 1935 may include data that may be used by these and other modules in some embodiments. In other embodiments, other or different software elements and/or data may be included in memory 1920.

Those skilled in the art will appreciate that computer system 1900 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1900 may be transmitted to computer system 1900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the systems and methods described herein may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
   using a computer to perform:
      detecting a touch on a surface of a tablet device;
      coincident with detecting the touch, detecting a stylus gesture performed via user manipulation of a stylus, the stylus gesture being one of a plurality of stylus gestures that each correspond to at least one of a plurality of actions in a graphics application, at least one of the plurality of stylus gestures configured to mimic a natural painting operation, and the stylus gesture includes moving the stylus in a fanning motion;
      responsive to detecting the stylus gesture and the touch, invoking a work mode that adjusts input parameters of a particular natural painting operation that corresponds to the stylus gesture, including invoking an arc drawing tool responsive to detecting the stylus moving in the fanning motion; and
      performing the particular natural painting operation in the graphics application, including drawing an arc in the graphics application with a focal point on the touch.

2. The method of claim 1, further comprising invoking an automatic zoom mode, invoking an automatic panning mode, invoking a steady detail work mode, or invoking a snap to grid mode.

3. The method of claim 1, wherein said invoking the work mode comprises changing one or more parameters of the graphics application to assist a user in performing the particular natural painting operation in progress.

4. The method of claim 1, wherein said detecting a touch comprises detecting a touch on a pressure-sensitive tablet device.

5. The method of claim 4, wherein said detecting a touch comprises determining a force with which the touch is applied to the pressure-sensitive device.

6. The method claim 1, wherein said detecting a touch comprises detecting a touch made by a finger, fingernail, knuckle, or hand of the user of the graphics application.

7. The method of claim 1, wherein the stylus gesture comprises one or more of a translation in one or more dimensions, a twisting motion, a barrel rotation, a fanning motion, a mashing down of the stylus into a tablet device, a jerking up motion, a jerking down motion, shaking the stylus away from the tablet device, and shaking the stylus toward the tablet device.

8. The method of claim 1, further comprising: determining whether the stylus is within a given threshold distance of the surface of the tablet device; wherein said determining a particular one of the actions is dependent on whether the stylus is within a given threshold distance of the surface of the tablet device.

9. The method of claim 1, wherein another stylus gesture comprises moving the stylus steadily in one direction, the work mode comprises a line drawing tool, and the natural painting operation comprises drawing a straight line.

* * * * *